(12) United States Patent
Doi et al.

(10) Patent No.: US 7,043,066 B1
(45) Date of Patent: May 9, 2006

(54) SYSTEM FOR COMPUTERIZED PROCESSING OF CHEST RADIOGRAPHIC IMAGES

(75) Inventors: Kunio Doi, Willowbrook, IL (US); Qiang Li, Clarendon Hills, IL (US); Shigehiko Katsuragawa, Morioka (JP); Takayuki Ishida, Hiroshima (JP)

(73) Assignee: Arch Development Corporation, Chicago, IL (US)

( * ) Notice: Subject to any disclaimer, the term of this patent is extended or adjusted under 35 U.S.C. 154(b) by 0 days.

(21) Appl. No.: 09/830,562

(22) PCT Filed: Nov. 5, 1999

(86) PCT No.: PCT/US99/24007

§ 371 (c)(1),
(2), (4) Date: Nov. 6, 2001

(87) PCT Pub. No.: WO00/28466

PCT Pub. Date: May 18, 2000

(51) Int. Cl.
*G06K 9/00* (2006.01)

(52) U.S. Cl. .................... 382/132; 382/308; 382/291; 382/294

(58) Field of Classification Search ................ 382/128, 382/130, 131, 133, 172, 209, 224, 256, 260, 382/266, 294, 132, 287, 291, 308
See application file for complete search history.

(56) References Cited

U.S. PATENT DOCUMENTS

| 4,907,156 | A | | 3/1990 | Doi et al. |
| 5,235,510 | A | * | 8/1993 | Yamada et al. ............ 600/300 |
| 5,319,549 | A | | 6/1994 | Katsuragawa et al. |
| 5,359,513 | A | * | 10/1994 | Kano et al. ................ 382/128 |
| 5,363,844 | A | * | 11/1994 | Riederer et al. ............ 600/413 |
| 5,440,647 | A | | 8/1995 | Floyd, Jr. et al. |
| 5,526,442 | A | | 6/1996 | Baba et al. |

(Continued)

FOREIGN PATENT DOCUMENTS

EP 0 633 547 1/1995

OTHER PUBLICATIONS

A. Kano, et al., Medical Physics, vol. 21, No. 3, XP-000435154, pp. 453-461, "Digital Image Subtraction of Temporally Sequential Chest Images for Detection of Interval Change," Mar. 1, 1994.

(Continued)

*Primary Examiner*—Barry Choobin
(74) *Attorney, Agent, or Firm*—Oblon, Spivak, McClelland, Maier & Neustadt, P.C.

(57) ABSTRACT

A method, system and computer readable medium for computerized processing of chest images including obtaining a digital first image of a chest (S100); producing a second image which is a mirror image (S300) of the first image; performing image warping on one of the first and second images to produce a warped image (S400) which is registered to the other of the first and second images; and subtracting the warped image from the other image to generate a subtraction image (S600). Another embodiment includes obtaining a digital first image of the chest of a subject; detecting ribcage edges on both sides of the lungs in the first chest image; determining average horizontal locations of the left and right ribcage edges at plural vertical locations; fitting the determined average horizontal locations to a straight line to derive a midline; rotating the chest image so that the midline is vertical; and shifting the rotated image to produce a lateral inclination corrected (S200) second image with the midline centered in the lateral inclination corrected image.

174 Claims, 15 Drawing Sheets

U.S. PATENT DOCUMENTS

| | | | |
|---|---|---|---|
| 5,638,458 A | | 6/1997 | Giger et al. |
| 5,982,915 A | * | 11/1999 | Doi et al. .................. 382/130 |
| 6,055,326 A | * | 4/2000 | Chang et al. ............... 382/132 |
| 6,067,373 A | | 5/2000 | Ishida et al. |
| 6,594,378 B1 | * | 7/2003 | Li et al. ..................... 382/128 |

OTHER PUBLICATIONS

K. H. Lee, Proceedings of 1993 International Joint Conference, vol. 2, XP-000499884, pp. 1227-1230, "The Difference Method: A Way of Detecting Abnormalities in MRI Images," Oct. 25, 1993.

F-F. Yin, et al., Medical Physics, vol. 18, No. 5, XP-000266638, pp. 955-963, "Computerized Detection of Masses in Digital Mammograms: Analysis of Bilateral Subtraction Images," Sep./Oct., 1991.

U.S. Appl. No. 09/830,562, filed Nov. 6, 2001, Doi et al.

U.S. Appl. No. 11/181,884, filed Jul. 15, 2005, Suzuki et al.

* cited by examiner

SYSTEM FOR COMPUTERIZED PROCESSING OF CHEST RADIOGRAPHIC IMAGES

STATEMENT REGARDING FEDERALLY SPONSORED RESEARCH

The present invention was made in part with U.S. Government support under USPHS grant numbers CA62625 and CA64370 (National Institute of Health). The U.S. Government has certain rights in the invention.

BACKGROUND OF THE INVENTION

1. Field of the Invention

The present invention relates generally to a computerized method and system provided to aid radiologists in detection of abnormalities, such as lung nodule, pneumothorax, pneumonia, and bulla, in chest radiographs.

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,740,268; 5,790,690; and 5,832,103; as well as U.S. patent application Ser. No. 08/158,388 (PCT Publication WO 95/14431); Ser. Nos. 08/173,935; 08/220,917 (PCT Publication WO 95/26682); Ser. No. 08/398,307 (PCT Publication WO 96/27846); Ser. No. 08/523,210 (PCT Publication WO 95/15537); Ser. Nos. 08/536,149; 08/562,087; 08/757,611; 08/758,438; 08/900,191; 08/900,361; 08/900,362; 08/900,188; 08/900,189, 08/900,192; 08/979,623; 08/979,639; 08/982,282; 09/027,468; 09/027,685; 09/028,518; 09/053,798; 09/092,004; 09/098,504; 09/121,719; 09/131,162; 09/141,535; and 09/156,413, all of which are incorporated herein by reference. Of these patents and applications, U.S. Pat. Nos. 4,907,156; 5,072,384; 5,224,177; 5,289,374; 5,319,549; 5,359,513; 5,463,548; 5,622,171; 5,790,690; Ser. Nos. 08/562,087; 08/562,188; 08/757,611; 08/758,438; 08/900,191; 08/900,361; 08/900,362; 09/027,685; 09/053,789; and 09/121,719 are of particular interest.

The present invention includes use of various technologies referenced and described in the above-noted U.S. patents and applications, as well as described in the references identified in the appended APPENDIX by the author(s) and year of publication and cross-referenced throughout the specification by numerals in brackets corresponding to the respective references listed in the APPENDIX, the entire contents of which, including the related patents and applications listed above and references listed in the APPENDIX, are incorporated herein by reference.

2. Discussion of the Background

Detection of early lung cancers on chest radiographs is a difficult task for radiologists, because subtle lesions tend to be low in contrast and can overlap with ribs and clavicles. To assist radiologists in the detection of newly developed abnormalities on chest radiographs, a temporal subtraction technique has been reported. [1] In this technique, a previous chest image is subtracted from a current chest image to produce a subtraction image. Subtle changes on chest radiographs can be enhanced on the subtraction image, and thus the detection accuracy of interval changes can be improved significantly by use of the temporal subtraction technique.

[2] However, the temporal subtraction technique is not applicable in the absence of a previous chest radiograph.

SUMMARY OF THE INVENTION

Accordingly, it is an object of the present invention to provide a method and system for the computerized detection of asymmetric abnormalities in a single chest radiograph.

It is another object of the present invention to provide a method and system for the computerized detection of asymmetric abnormalities in a single chest radiograph using a contralateral subtraction technique.

It is another object of the present invention to provide a method and system for the computerized detection of asymmetric abnormalities in a single chest radiograph using a contralateral subtraction technique employing lateral inclination correction, a reversed "mirror" image, warping of the mirror image, and subtraction of the warped mirror image from the original image to derive the contralateral subtraction image.

It is another object of the present invention to provide a method and system for the computerized detection of asymmetric abnormalities in a single chest radiograph using a contralateral subtraction technique and successively applying three techniques to an initial contralateral subtraction image to acquire improved subtraction images.

It is another object of the present invention to provide a method and system for the removal of false positives from difference images using a contralateral subtraction technique in computerized detection of lung nodules in single chest radiographs.

It is another object of the present invention to provide a method and system for improved temporal subtraction using a midline detection method of a contralateral subtraction technique.

These and other objects are achieved according to the present invention by providing a novel method, system and computer readable medium for computerized processing of chest images including obtaining a digital first image of a chest; producing a second image which is a mirror image of the first image; performing image warping on one of the first and second images to produce a warped image which is registered to the other of the first and second images; and subtracting the warped image from the other image to generate a subtraction image.

Another embodiment useful when temporally spaced images are available includes obtaining a digital first image of a chest of a subject; detecting ribcage edges on both sides of the lungs in the first chest image; determining average horizontal locations of the left and right ribcage edges at plural vertical locations; fitting the determined average horizontal locations to a straight line to derive a midline; rotating the chest image so that the midline is vertical; and shifting the rotated image to produce a lateral inclination corrected second image with the midline centered in the lateral inclination corrected image.

The present invention also includes a computer readable medium storing program instructions by which the method of the invention can be performed when the stored program instructions are appropriately loaded into a computer, and a system for implementing the method of the invention.

Thus, according to the present invention, a new contralateral subtraction technique based on one posteroanterior (PA) chest image has been developed. Since the rib structure is nearly symmetrical, the chest image of the right peripheral lung is generally similar to that of the left lung. Taking advantage of this, the technique includes lateral inclination correction by rotating and shifting the original chest image so that the midline of the thorax is aligned with the vertical centerline of the original chest image, lateral reversal of the rotated image to produce a reversed "mirror" image, warping of the mirror image, and subtraction of the warped mirror image from the original image to derive the contralateral subtraction image. Thereafter, additional processing techniques can be successively applied to the initial contralateral subtraction image to acquire improved subtraction images. In the technique, a contralateral subtraction image can be obtained by subtracting the right/left reversed "mirror" image from a single chest image. Similar to the temporal subtraction technique, the contralateral subtraction scheme can cancel out most of symmetrical skeletal structures and enhance asymmetrical opacities, thus demonstrating subtle abnormalities more clearly. On the other hand, unlike the temporal subtraction technique, a subtraction image can be obtained whenever a single PA chest image is available. Therefore, the contralateral subtraction technique can be of significant clinical importance in some cases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 1($b$) is an overall scheme for improved temporal subtraction using a midline detection method of a contralateral subtraction technique;

FIG. 1($c$) is an overall scheme for the removal of false positives from difference images using a contralateral subtraction technique in computerized detection of lung nodules in single chest radiographs;

DESCRIPTION OF THE PREFERRED EMBODIMENTS

Figure 1A:
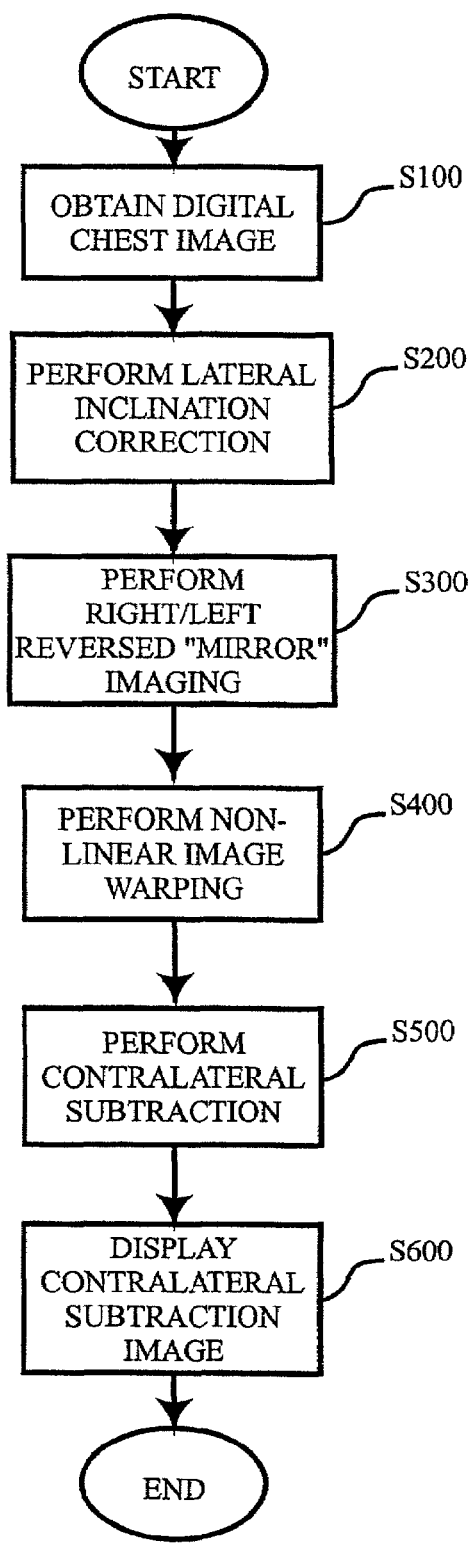
FIG. 1($a$) is an overall scheme of a contralateral subtraction technique for a PA chest image.

The chest images used in development of the present invention consist of 50 normals and 50 abnormals with solitary lung nodules which were selected from 247 chest images in the Japanese Standard Digital Image Database developed by the Japanese Society of Radiological Technology. [3] The images were digitized with a 0.175 mm pixel size, a matrix size of 2048×2048 and 12 bits gray levels. However, the matrix size was reduced to 512×512 by subsampling of the original image data, and the number of gray levels was decreased to 10 bits.

Referring now to the drawings, wherein like reference numerals designate identical or corresponding parts throughout the several views, and more particularly to FIG. 1($a$) thereof, there is illustrated a top-level block diagram of a contralateral subtraction technique according to the present invention.

First of all, for an obtained PA chest image in step S100, the lateral inclination which may be caused by an improper patient positioning is corrected by an image rotation technique at step S200. The rotated image is laterally (right/left) reversed to produce a reversed "mirror" image at step S300. The mirror image is registered to the original image by use of a cross correlation technique, and then deformed based on a nonlinear image warping technique in order to match peripheral ribs in the mirror image with those in the original image at step S400. [1] Finally, the warped mirror image is subtracted from the original image at step S500 to derive the contralateral subtraction image at step S600. The details of steps S100–S600 will now be described.

Lateral inclination correction (Step S200) is designed particularly to correct lateral inclination of the thorax in the chest image. If the midline of the thorax is inclined slightly with an angle from the vertical direction, then the difference in the angles of the midlines between the original and the reversed chest images will become twice as large, which may lead to a serious misregistration error, and thus result in a poor subtraction image. It is therefore necessary to correct the lateral inclination before the subtraction technique is applied, by rotating the image so that the midline is in a vertical direction and then shifting the midline of the thorax to the vertical centerline of the original chest image, performed step S200. The rotating and shifting of the image can be, for example, achieved using conventional image rotation and shifting techniques as is known in the imaging arts.

Midline Detection:

In the past, a profile based midline detection method has been applied to several computer-aided diagnosis (CAD) schemes with relatively satisfactory results. [5, 6] First, nine regions of interest (ROIs) are selected in the mediastinal region from the top to the bottom of the lung. To reduce the effect of noise level on the determination of the midline, the pixel values in each ROI are averaged along the vertical direction, which gives rise to a one dimensional (1-D) horizontal profile. For each profile, the maximum pixel value and its corresponding position are determined. Finally, the midline is determined by fitting the nine points to a straight line.

If the pixels along the midline have local maximum values along a straight line, then this method can give satisfactory results. However, in many cases, the pixels on the midline are not necessarily local maximum values. For example, the pixels in the cardiac region are often greater than those near the midline, and thus the detected midline is commonly shifted to the cardiac region, resulting in an angulated incorrect midline, as will be illustrated later. Moreover, even though the pixels on the midline have local maximum values, the difference between these values and pixel values in the adjacent area is usually very small, which makes the prior method intrinsically vulnerable to image noise. Therefore, according to the present invention, a new ribcage edge based midline detection method has been devised, next described.

First, the ribcage edges on both sides of the lungs are detected. Second, the average horizontal locations of the left and right ribcage edges are determined and then fitted to a straight line to derive the midline. The ribcage edges are detected by analyzing the first and second derivatives of profiles through chest images. [4] The detected ribcage edges are then fitted to a third order polynomial function to form smooth curves and also reduce noise, as described in detail elsewhere. [4] The ribcage edge detection method and the previous midline detection method described above, both detect edges or peaks by analyzing profiles and fitting them to some functions. However, the results of ribcage edge detection are far more reliable than the results of the previous midline detection because the contrast on the ribcage edges is usually much greater. This is why the present invention preferably employs the ribcage edges for determination of the midline.

Once the right and left ribcage edges are obtained, the average horizontal locations (i.e., mid-points) of the right and left ribcage edges at the same vertical position of the chest image are then determined. Due to the nearly symmetrical property of the ribcage edges on both sides of the lungs, most of the mid-points (or average locations) lie on a straight line, and thus these points are fitted to a straight line to produce the expected midline. In other words, a straight line to divide the lungs into two approximately symmetrical and equal parts is determined. Since the mid-points are derived from the average horizontal locations of the right and left ribcage edges, the variance of errors in these mid-points is expected to be a half of that in the detected ribcage edges, which would also contribute to a higher accuracy of the detected midline.

Determination of Gold Standard for the Midline of Chest Images:

In order to evaluate the accuracy of the detected midline, "truth" data about the midline on PA chest images are required. According to the present invention, a "gold standard" based on subjective judgments was obtained. First of all, it is assumed that a midline can be represented by a straight line. For each of 100 chest images, three observers independently indicated both ends of a midline on the computer screen by using a mouse. The corresponding end points of three located midline are averaged to yield the gold standard for each case.

Nonlinear Warping of Right/Left Reversed "Mirror" Image (Steps S300, S400):

At step S300, a right/left reversed mirror image is obtained by laterally reversing the original image after the lateral inclination is corrected at step S200. This reversed mirror image will be warped and then subtracted from the original image to produce the contralateral subtraction image. A nonlinear image warping technique has been used successfully in the temporal subtraction technique applied to chest images as described in detail previously (see, e.g., patent application Ser. No. 09/053,789). According to the present invention, a similar image warping technique to obtain image registration is employed. However, proper modifications are made in image warping as applied to contralateral subtraction as described below. The nonlinear image warping technique includes initial global matching, detailed local matching of peripheral ribs, determination of shift values, and coordinate conversion. In addition, nonlinear image warping can be performed iteratively to yield improved results. [5]

Initial Global Matching on Overall Chest Image:

The initial global matching technique, which has been already applied to the temporal subtraction technique, is used for aligning the approximate lung area in the reversed mirror image to that in the original image. [6] First, the matrix sizes of two images, i.e., the original chest image and the reversed mirror image are reduced by a factor of four, and smoothed by a Gaussian filter to reduce the effect of the fine anatomical structures, such as small vessels, bronchi, devices and catheters on global matching of the two images. The lungs are then extracted from each of the two images by using ribcage edge information described above, and the region outside the ribcage edges is ignored. Finally, the upper parts of the lungs are aligned by using a cross correlation technique.

Local Image Matching of Peripheral Ribs Excluding Mediastinal and Cardiac Regions To perform local image matching of peripheral ribs in the right and left lungs, it is necessary to select a large number of template ROIs and search area ROIs. The template ROIs and the corresponding search area ROIs are automatically located within the lung regions of the original image and the reversed image, respectively, in the same way as those ROIs were located by the temporal subtraction technique. [1] The matrix sizes of template and search area ROIs are 32×32 and 64×64, respectively. It is important to note that with the contralateral subtraction technique, the mediastinal and cardiac regions are excluded for the selection of the ROIs, because the ROIs in the mediastinal and cardiac regions do not contain useful information for reliable image matching for the contralateral subtraction. [7] Once the template ROIs and search area ROIs are determined, a cross correlation technique is employed to perform the local image matching for the determination of the shift values Δx and Δy in two orthogonal directions, which indicate a shift of the coordinates of the center of a search area ROI in the reversed mirror image, for the best match of the template ROI with the corresponding "matched" area in the search area ROI. [1]

Separate Fittings of Shift Values in the Right and Left Lungs:

Since there are some variations in the shift values over the lung areas, a two dimensional surface fitting using a 10th order polynomial is applied to smooth each set (Δx and Δy) of the shift values. [1] Initially, each set of the shift values in both the right and left lungs was fitted simultaneously, as was applied for the temporal subtraction technique. However, with the contralateral subtraction it was noted that the shift values in the right and left lungs can be quite different in some cases. Therefore, the shift values in the right and left lungs are fitted separately and independently for the contralateral subtraction. This separate fitting technique is possible because it is not necessary in contralateral subtraction to have one smooth function over the entire chest image. The four sets of fitted 10th order polynomials for each of Δx and Δy are then used to perform the coordinate transformation on each of the right and left lungs independently in the reversed image, which produces a warped reversed image for the contralateral subtraction.

Figure 2B:
FIGS. 2($a$), 2($b$), 2($c$) and 2($d$) are images showing for comparison (a) an original chest radiograph, (b) a contralateral subtraction image including all regions, (c) a contralateral subtraction image with a uniform background over an area outside the two lungs, and (d) a contralateral subtraction image with a "chest" background, which is the original image superimposed over the area outside the two lungs, respectively.
Figure 2A:
Figure 2D:
Figure 2C:
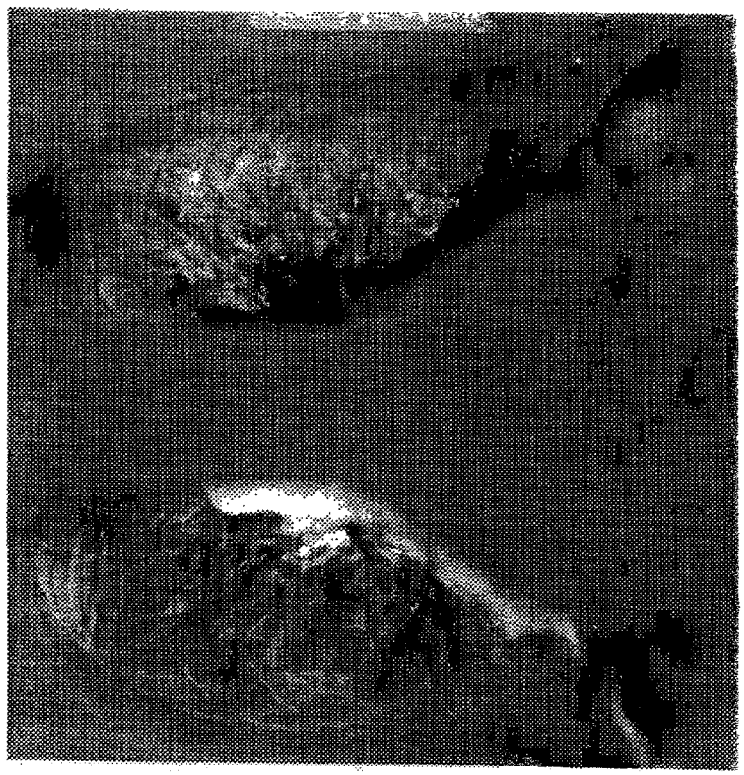

Display of Contralateral Subtraction Images (Steps S500, S600):

A contralateral subtraction image is obtained by subtracting the warped reversed image from the original image at step S500. At step S600, in order to enhance image contrast to a proper level, the pixel values of the subtraction image may be multiplied by a factor such as 1.5 and 2.0. However, a factor of 1.0 can be used also for maintaining the same contrast of abnormal opacities in the contralateral subtraction image as that in the original image. A constant pixel value of 512 is then added to the contrast enhanced subtraction image, and the background region outside lungs is assigned a constant pixel value of 512 in order to display only the contralateral subtraction image of peripheral lungs. Note that the display of the mediastinal and cardiac regions is not useful and can be disturbing to radiologists due to a large "misregistration" artifacts. FIG. 2(a) shows an original chest image, and FIGS. 2(b) and 2(c) show, for comparison, contralateral subtraction images without and with the uniform background, respectively. The subtraction image with the uniform background can present effectively the asymmetric opacities in lung regions by dark patterns in the ipsilateral side and light patterns in the contralateral side. Note also that the original PA chest image outside lung areas, instead of the constant background, can be displayed to maintain the general appearance of a "chest" background, as shown in FIG. 2(d). In fact, many radiologists preferred the display of the FIG. 2(d) contralateral subtraction image.

Subjective Evaluation for the Quality of Subtraction Image:

To evaluate subjectively the quality of the contralateral subtraction image, a five-point rating score, which has been used previously for subjective evaluation of the temporal subtraction image, is employed according to the present invention, that is, 5 (excellent): all ribs are perfectly registered, (and thus eliminated), 4 (good): most ribs are almost completely registered with very minor misregistration errors partly, 3 (adequate): most ribs are well registered with some minor misregistration errors, 2 (poor): most ribs are not well registered and appear in half of the intercostal space, and 1 (very poor): most ribs are not registered and appear in the entire intercostal space.

Another rating method is also used to examine the change in the quality of the subtraction image due to the use of an improved technique which will be later described. The rating score ranges from −2 to +2 as follows, when the quality of the subtraction image is +2: clearly improved, +1: moderately improved, 0: unchanged, −1: moderately degraded, and −2: clearly degraded.

Figure 3:
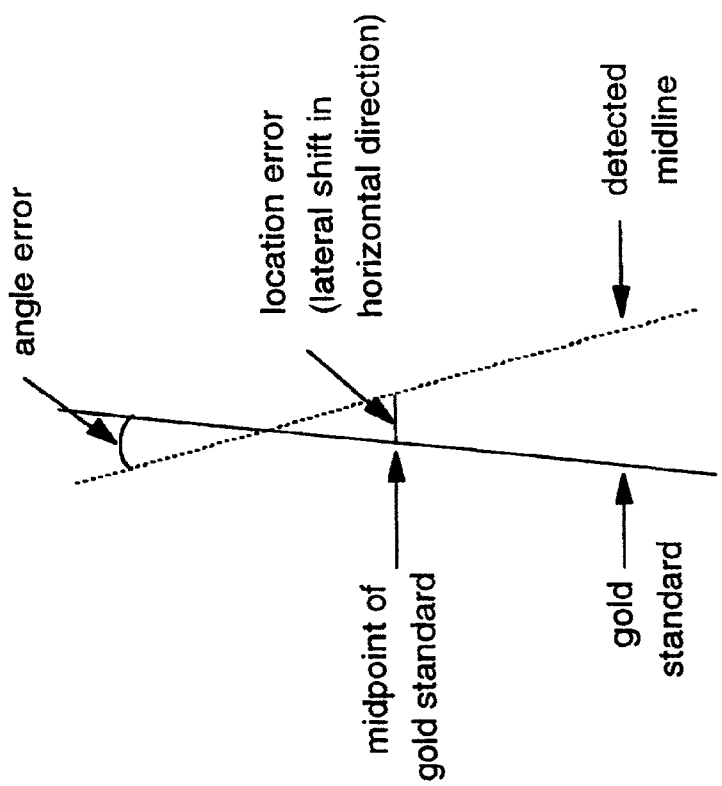
FIG. 3 is an illustration of measures for errors of angle and location of a detected midline relative to a gold standard.

Comparison of Accuracy for Two Midline Detection Methods:

The accuracy of the detected midline is evaluated by determining the errors of angle and location of the midline compared with the gold standard. FIG. 3 shows the definitions for the errors of the angle and the location of the detected midline. The error of angle between the detected midline and the gold standard is defined by the angle between the orientations of the detected midline and the gold standard. The error of location is defined by the horizontal distance of the detected midline from the gold standard at the vertical position of the midpoint between the two ends of the gold standard.

Figure 4:
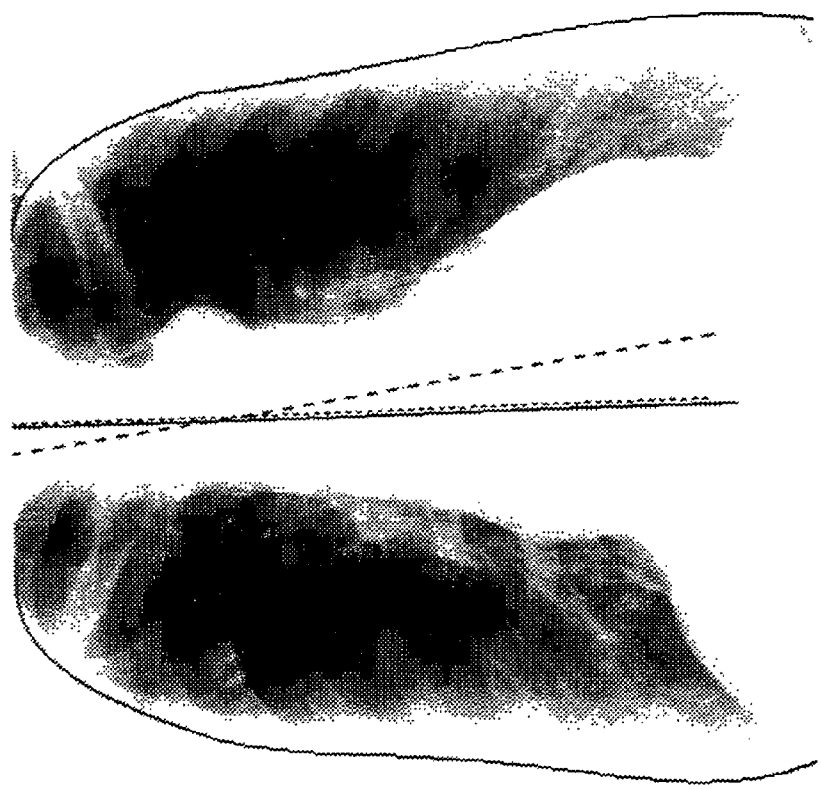
FIG. 4 is a chest radiograph with a gold standard (black solid line) for midline, detected midlines given by a profile based method (dashed line) and by a ribcage edge based method (dotted line)

FIG. 4 shows a chest radiograph with the gold standard (solid line) and midlines detected by the profile based method (dashed line) and the ribcage edge based method (dotted line). The detected ribcage edges are also shown by the solid curves. The midline by the ribcage edge based method is very similar to the gold standard, whereas the midline by the profile based method is angulated and quite different from the gold standard probably due to the effect of the cardiac region, as described earlier.

Figure 5B:
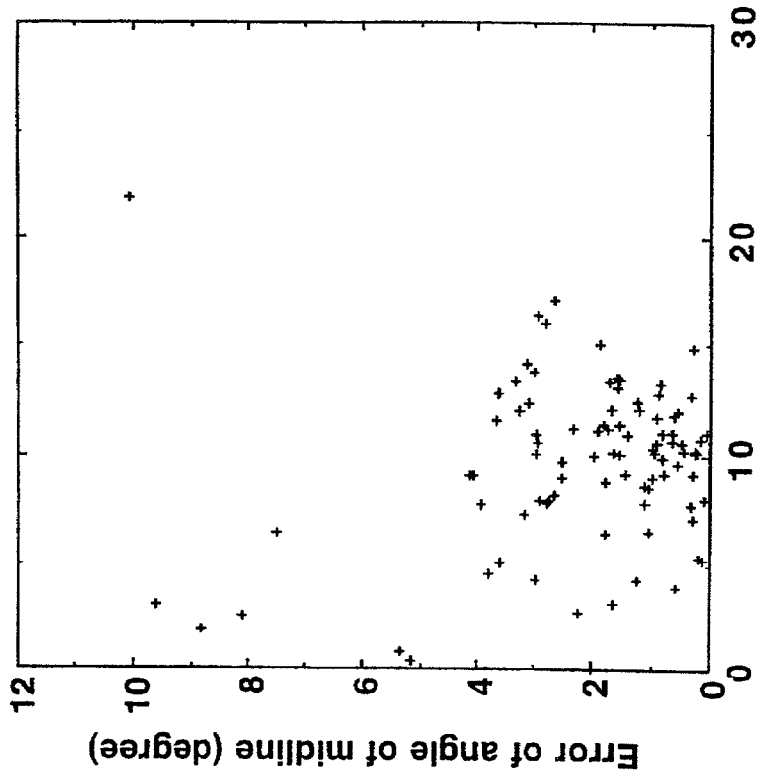
FIGS. 5($a$), 5($b$) and 5($c$) are charts illustrating (a) distribution of errors for angles and locations from a gold standard for individual midlines indicated by three observers, (b) distribution of errors for a midline detected by a profile based method, (c) distribution of errors for a midline detected by a ribcage edge based method, respectively.
Figure 5A:
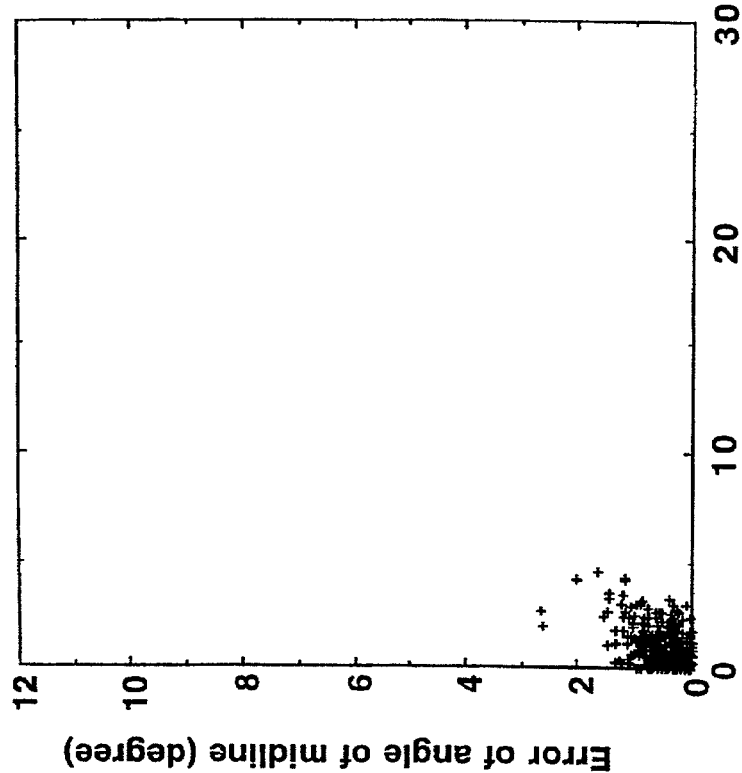
Figure 5C:
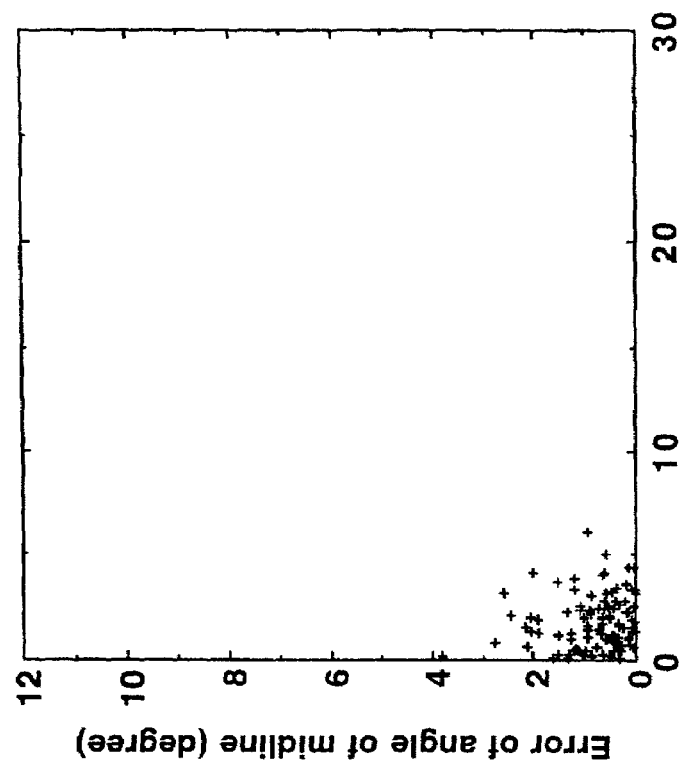

FIG. 5(a) shows the distribution of the errors of angles and locations from the gold standard for individual midlines indicated by three observers. It is apparent that most points are distributed around the origin, which indicates that the errors are relatively small and the midline data given by three observers are quite consistent. FIGS. 5(b) and 5(c) show the distribution of the errors for the detected midlines given by the profile based and the ribcage edge based methods, respectively. It is clear that the ribcage edge based method can provide more accurate results than the profile based method. Table 1 shows the comparison of the standard deviations for errors of angles and locations for the midlines measured by observers and by the two midline detection methods. Note that the standard deviations obtained by the ribcage edge based method are considerably smaller than those by the profile based method, and comparable to those by observers.

TABLE 1

RMS errors from gold standard for the angles and locations of the midlines measured by various methods

| | RMS errors of angles (degree) | RMS errors of locations (mm) |
|---|---|---|
| Observers' data | 0.56 | 1.2 |
| Profile based midline detection method | 2.2 | 9.6 |

TABLE 1-continued

RMS errors from gold standard for the angles and
locations of the midlines measured by various methods

|  | RMS errors of angles (degree) | RMS errors of locations (mm) |
|---|---|---|
| Ribcage edge based midline detection method | 0.81 | 1.8 |

Improvements of Contralateral Subtraction Images by Three Techniques:

Table 2 demonstrates the distribution of the number of cases for different subjective rating scores on the quality of subtraction images, which are obtained with an initial scheme and also by incorporating successively the three techniques.

TABLE 2

Distribution of the numbers of chest images for different subjective
rating scores on the quality of contralateral subtraction images,
which are obtained with an initial scheme and by
incorporating additional techniques for improvements

| Rating score* | (a) initial technique | (b) plus lateral inclination correction | (c) plus exclusion of cardiac region | (d) plus separate fittings on two lungs |
|---|---|---|---|---|
| 5 | 3 | 7 | 12 | 15 |
| 4 | 35 | 33 | 35 | 36 |
| 3 | 35 | 48 | 42 | 40 |
| 2 | 22 | 11 | 10 | 8 |
| 1 | 5 | 1 | 1 | 1 |

*5: excellent, 3: adequate, 1: very poor.

Table 3 shows the distribution of the number of cases for the change in subjective rating scores on the quality of subtraction images due to the successive use of the three techniques. At the initial phase of this study, 100 cases of chest radiographs with the initial contralateral subtraction scheme without the three techniques were examined.

TABLE 3

Distribution of the numbers of chest images
affected by three techniques in terms of subjective rating
scores on the quality of contralateral subtraction images

| Rating score* | (a) lateral inclination correction | (b) exclusion of cardiac region | (c) separate fittings on two lungs |
|---|---|---|---|
| +2 | 9 | 2 | 0 |
| +1 | 18 | 16 | 10 |
| 0 | 62 | 75 | 89 |
| −1 | 11 | 7 | 1 |
| −2 | 0 | 0 | 0 |

*+2: clearly improved, 0: no change, −2: clearly degraded.

As shown in Table 2, 73 cases (73% of 100 subtraction radiographs showed adequate, good, or excellent quality, whereas the remaining 27 cases were severely misregistered. Many of these misregistered cases can be improved by incorporating the three techniques, as described below.

Figure 6A:
FIGS. 6($a$), 6($b$) and 6($c$) are images showing for comparison (a) an original chest radiograph, (b) a contralateral subtraction image obtained by using a profile based method for midline detection, and (c) an improved subtraction image obtained by using a ribcage edge based method for midline detection, respectively.
Figure 6C:
Figure 6B:

The first technique is the use of an improved midline detection method based on the ribcage edges, instead of the profile based method, to correct for the lateral inclination of the thorax in chest radiographs. As shown in the first column (a) of Table 3, this technique can improve the contralateral subtraction images considerably, especially for those cases with initially lower subjective rating scores. This can also be observed from the second column (b) of Table 2, where the numbers of cases with rating scores of 1 and 2 are decreased considerably after the new midline detection method is used. FIG. 6 shows comparison of (a) an original chest radiograph, (b) a contralateral subtraction image obtained by using a profile based method for midline detection, and (c) an improved subtraction image obtained by using a ribcage edge based method for midline detection. It is apparent in FIG. 6 that the subtraction image is clearly improved by using the new midline detection method.

Figure 7B:
FIGS. 7($a$), 7($b$) and 7($c$) are images showing for comparison (a) an original chest radiograph, (b) a contralateral subtraction image obtained by including mediastinal and cardiac regions for shift value analysis, and (c) an improved subtraction image obtained by eliminating the mediastinal and cardiac regions from the shift value analysis, respectively.
Figure 7A:
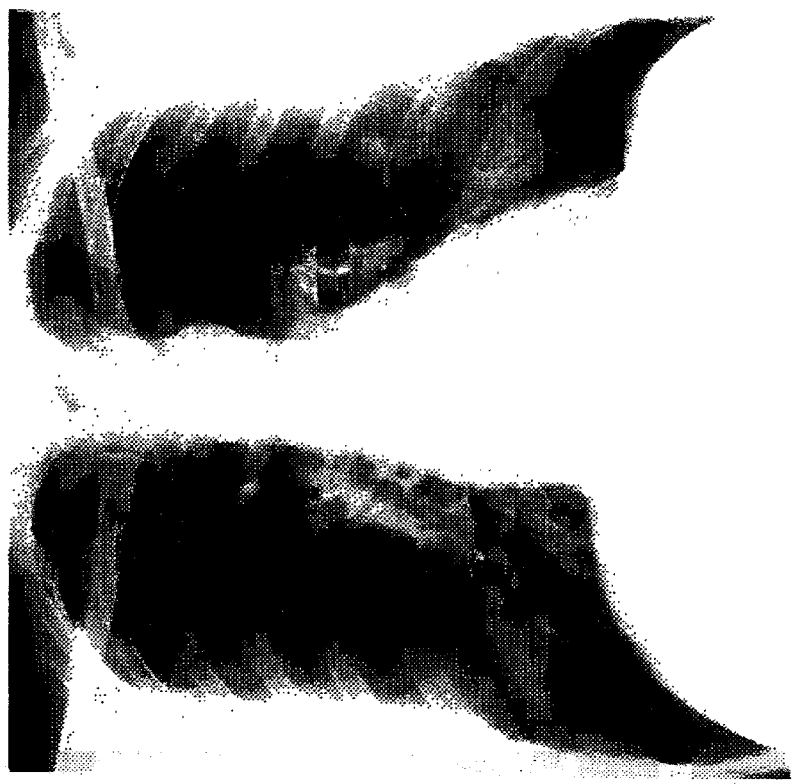
Figure 7C:

The second technique is the elimination of the mediastinal and cardiac region for the shift value analysis. This technique is equivalent to the application of the contralateral subtraction technique to lung areas alone. The improvement in the contralateral subtraction images is indicated in the second column (b) in Table 3, and the rating scores for the improved quality of subtraction images are listed in the third column (c) in Table 2. FIG. 7 shows comparison of (a) an original chest radiograph, (b) a contralateral subtraction image obtained by including mediastinal and cardiac regions for shift value analysis, and (c) an improved subtraction image obtained by eliminating the mediastinal and cardiac regions from the shift value analysis. It is apparent in FIG. 7 that the subtraction images are further improved by adding the second technique.

Figure 8A:
FIGS. 8($a$), 8($b$) and 8($c$) are images showing for comparison (a) an original chest radiograph, (b) a contralateral subtraction image obtained by using simultaneous fittings of shift values in right and left lungs, and (c) an improved subtraction image obtained by using separate fittings of shift values in the right and left lungs, respectively.
Figure 8C:
Figure 8B:

The third technique is the separate fittings of shift values on the right and left lungs independently. The last columns in Tables 2 and 3 show the improvement made by this technique and the final rating scores for the quality of subtraction image, respectively. By employing the three techniques, ninety one (91%) of 100 cases are rated as score 3 or above. FIG. 8 shows comparison of (a) an original chest radiograph, (b) a contralateral subtraction image obtained by using simultaneous fittings of shift values in right and left lungs, and (c) an improved subtraction image obtained by using separate fittings of shift values in the right and left lungs. These experimental results indicate that the contralateral subtraction technique can provide good subtraction images for most of cases.

Figure 9B:
FIGS. 9($a$) and 9($b$) are images showing for comparison (a) an indicated lung nodule, and (b) a contralateral subtraction image with an enhanced nodule, respectively.
Figure 9A:

The contralateral subtraction technique can be used to detect asymmetric abnormalities, for example, lung nodule, pneumothorax, pneumonia, and bullae, on single chest radiograph. FIG. 9(a) shows a chest radiograph with a lung nodule indicated by an arrow, and its contralateral subtraction image in FIG. 9(b). It is apparent that the lung nodule is enhanced in the subtraction image, since most of symmetric skeletal structures are canceled out.

According to the present invention, it was assumed that the midline of the thorax can be represented approximately by a straight line. It is believed that this assumption is valid in most of PA chest images. However, due to large variations of individual radiographs, this assumption is not always valid to describe midlines in all clinical chest radiographs. In some cases, a nonlinear model to represent the midlines adequately may be needed. For example, a polynomial with the order of 2 or 3 may be suitable for representing the curved midline. Nevertheless, according to the present invention the linear model was used, because the midline is used only for correcting the lateral inclination of the thorax in a chest radiograph. Note that the linear model is simple and adequate for this invention. A complex nonlinear model may complicate the problem and lead to difficulty in determining a proper correction of the midline.

In the past, the subtraction images have been displayed with the small matrix size of 512×512, because the cross-correlation technique and the subsequent image warping technique have been applied to this small matrix size. According to the present invention, a technique to display a high quality, large matrix subtraction image, and equivalently a high quality subtraction image with a small pixel size was devised. This is accomplished by employing a large matrix image such as 1024×1024 or 2048×2048 for image warping of the reversed mirror image for the contralateral subtraction technique and the previous image in the case of the temporal subtraction technique, as will be further discussed. Although the shift values of the coordinate transformation are determined initially on the 512×512 matrix image, the corresponding shift values for the large matrix size are obtained by scaling using a factor of two or four for the matrix size of 1024×1024 or 2048×2048, respectively, of the reversed mirror image (or the previous image in the case of temporal subtraction technique). The large matrix subtraction image is obtained by subtracting the large matrix warped image from the large matrix original chest image. This technique for display of the larger matrix size and thus the use of a small pixel size was very useful for producing high quality subtraction images by elimination of pixel edges and pixel artifacts due to the use of a small matrix size (or a large pixel size) for the temporal and the contralateral subtraction techniques. It is useful also to apply an image processing technique such as a median filter and a Gaussian filter for smoothing the subtraction images by elimination of image noise and relatively small misregistration artifacts.

Improved Temporal Subtraction Technique Using the New Midline Detection Method:

The above-described three techniques to improve contralateral subtraction images according to the present invention are applicable to the temporal subtraction technique [1,2] for improvement of the quality of temporal subtraction images. The basic scheme of the temporal subtraction technique is briefly described here. A number of template ROIs (32×32 matrix) and the corresponding search area ROIs (64×64 matrix) are selected from the previous and the current images, respectively, to perform local matching of image details in the two images. The shift values, Δx and Δy, for all pairs of selected ROIs are then determined by using a cross-correlation technique to find the best matched areas in the search area ROI. A two-dimensional surface fitting using a polynomial function is applied to each set of mapped shift values, Δx and Δy, for conversion of the x, y coordinates of the previous image, i.e., for warping of the image. The warped previous image is then subtracted from the current image to produce the temporal subtraction image. The temporal subtraction image has been shown to be very useful to detect subtle interval changes in chest images. In order to reduce misregistration artifacts in the temporal subtraction image, a second image warping technique can be employed by using the current and the first warped previous image. The final temporal subtraction image is obtained by subtraction of the second warped previous image from the current chest image. The image warping technique can be applied repeatedly and thus iteratively; this technique is therefore called an iterative image warping technique. [5]

Figure 1B:
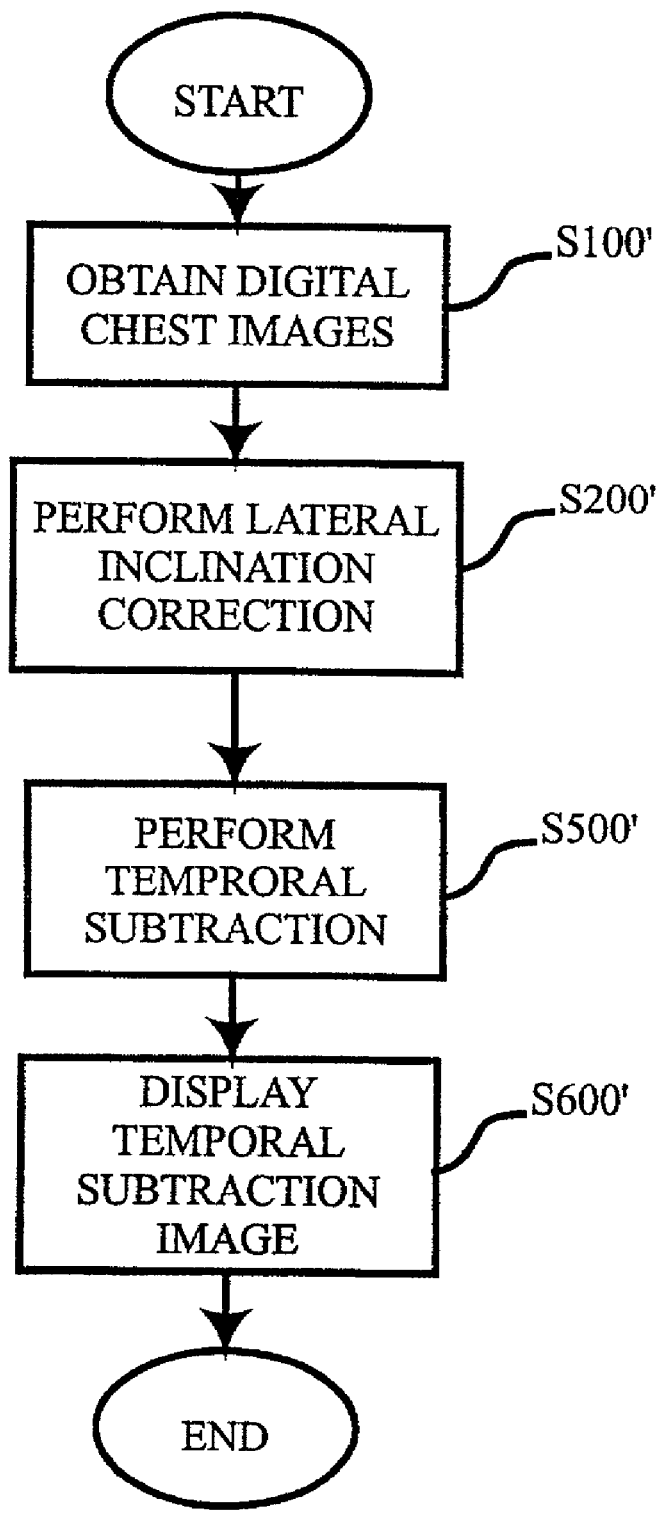

FIG. 1(b) is an overall scheme for improved temporal subtraction using the previously described midline detection method of the contralateral subtraction technique (e.g., FIG. 1(a) step S200). In FIG. 1(b), at step S100' current and previous chest images are obtained. In step S200', lateral inclination correction is performed on the obtained images using the midline detection method of the contralateral subtraction technique to reduce effects of misregistration. Next, at step S500', temporal subtraction is performed and at step S600' the temporally subtracted image is displayed.

According to the present invention, it was found that the ribcage edge based technique for an improved midline detection was particularly useful, as the results of subjective evaluation are illustrated in Tables 4 and 5.

TABLE 4

Distribution of the numbers of chest images for different subjective rating scores on the quality of temporal subtraction images, which are obtained by using profile based and ribcage edge based midline detection method to correct lateral inclination

| Rating score* | Previous method by profile based midline detection | New method by ribcage edge based midline detection |
|---|---|---|
| 5 | 22 (12.2%) | 27 (14.9%) |
| 4 | 82 (45.3%) | 88 (48.6%) |
| 3 | 65 (35.9%) | 55 (30.4%) |
| 2 | 10 (5.5%) | 8 (4.4%) |
| 1 | 2 (1.1%) | 3 (1.7%) |

*5: excellent, 3: adequate, 1: very poor.

TABLE 5

Distribution of the numbers of chest images for different subject rating scores on the improvement of quality of temporal subtraction images by replacing profile based midline detection method with ribcage edge based midline detection method

| Rating score* | |
|---|---|
| +2 | 13 (7.2%) |
| +1 | 45 (24.9%) |
| 0 | 107 (59.0%) |
| −1 | 13 (7.2%) |
| −2 | 3 (1.7%) |

*+2: clearly improved, 0: no change, −2: clearly degraded.

According to the present invention, 181 pairs of current and previous chest images, which were obtained from the lung cancer screening program at Iwate prefecture in Japan were employed. These chest images are obtained by using a Fuji computed radiography (CR) system which was installed in a mobile screen unit. Digital image data from the CR system are directly used for calculating the temporal subtraction images using the image warping technique. It is apparent in Tables 4 and 5 that the quality of temporal subtraction images is considerably improved by using the new midline detection technique.

The technique to display a high quality, large matrix subtraction image, as described above, can be applied to temporal subtraction images.

Contralateral Subtraction: Removal of False Positives in Computerized Detection of Lung Nodules in Chest Radiographs:

The contralateral subtraction technique can be incorporated into a computer-aided diagnosis scheme to improve the overall performance. For example, it is very difficult to eliminate some false positives caused by rib—rib crossings or vessel-rib crossings in the computerized detection of lung nodules in chest radiographs using a difference imaging scheme. These false positives can be eliminated by analyzing image features derived from the contralateral subtraction image.

The computerized difference imaging scheme is briefly described here. [8] First, digital chest images or a digitized version of conventional chest radiographs are subjected to two filtering operations which are operated in parallel. One produces an enhanced image of nodules by using a filter such as a matched filter, and the other provides a suppressed image of nodules by using another filter such as a ring average filter. A difference image is then obtained by subtraction of the suppressed image from the enhanced image. The difference image contains strongly enhanced nodules and strongly suppressed background, which is due to the removal of the majority of the normal anatomic background structures, and therefore is useful for identifying candidates of nodules. This difference image technique is considered a generalization of edge enhancement techniques, and in fact the difference image looks very similar to edge-enhanced images. If the two filters are linear filters, then the two can be combined into one filter operation. However, if a non-linear filter is applied, two filtering operations need to be applied separately in parallel. The difference image technique is applicable to computerized detection of isolated abnormal patterns such as microcalcifications and masses in mammograms.

The initial candidates of lung nodules are identified from relatively round patterns with large pixel values in the difference image, which may include nodules as well as normal structures such as ribs and pulmonary vessels. Therefore, image features of these candidates are extracted and quantified in terms of the size, contrast, and other parameters related to the shape of the candidates. Specifically, the extracted features are related to gray level, morphology, or edge gradient, such as effective diameter, degrees of circularity and irregularity, slopes of the effective diameter and degrees of circularity and irregularity, average gradient, standard deviation of gradient orientation, contrast and net contrast (e.g., as taught in patent application Ser. No. 08/562,087). A rule-based method (e.g., as taught in U.S. Pat. Nos. 5,463,548 and 5,622,171 and patent application Ser. Nos. 08/562,087; 08/562,188; 08/758,438; 08/900,361; and 09/027,685) is then applied which removes some candidates as false positives, when their features are matched to those of normal anatomic structures such as end-on vessels, rib—rib crossings, rib-vessel crossings, aggregates of vessels, and rib-clavicle crossings.

Finally, a trained artificial neural network (ANN), trained by use of a number of image features, is employed for further removal of false positives in the remaining candidates (e.g., as taught in U.S. Pat. Nos. 5,463,548 and 5,622,171 and patent application Ser. Nos. 08/562,087; 08/562,188; 08/758,438; 08/900,361; and 09/027,685). When the database of 100 chest images with lung nodules and 100 normal cases was used, the performance of the difference imaging scheme provided 70% sensitivity at a false positive rate of 1.7 per image.

Figure 1C:
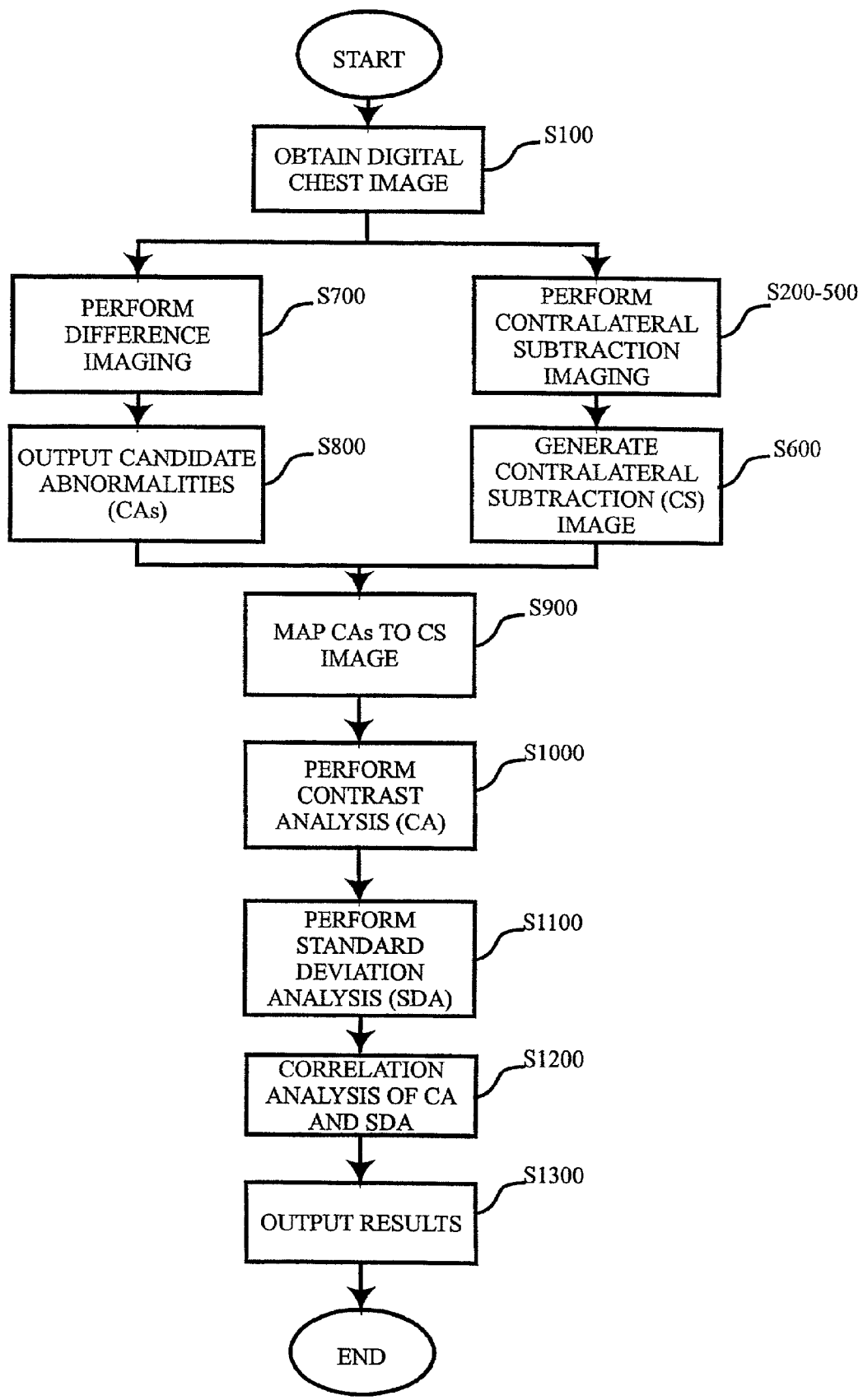

FIG. 1(c) is an overall scheme for the removal of false positives from difference images using a contralateral subtraction technique in computerized detection of lung nodules in single chest radiographs.

According to the present invention, 10 chest radiographs, each of which included solitary lung nodules were obtained (step S100). Results of this study indicated that all of ten nodules were correctly detected by the computerized difference imaging scheme, but the total of 14 false positives appeared in lung fields of ten chest images were reported (steps S700–S800). All of these false positives were related to ribs such as rib—rib crossings, rib-vessel crossings and rib-clavicle crossings.

Then the contralateral subtraction images were obtained for all of ten chest images (steps S200–S600). All of the 24 locations on original chest images, which included 10 nodules and 14 false positives, indicating the computer output of the nodule detection scheme were then converted to the corresponding locations on the contralateral subtraction images (step S900). This conversion was necessary because the contralateral subtraction images were obtained after the original chest images were rotated and shifted for correction of the lateral inclination (steps S200–S600), as described earlier.

Figures 10, 11:
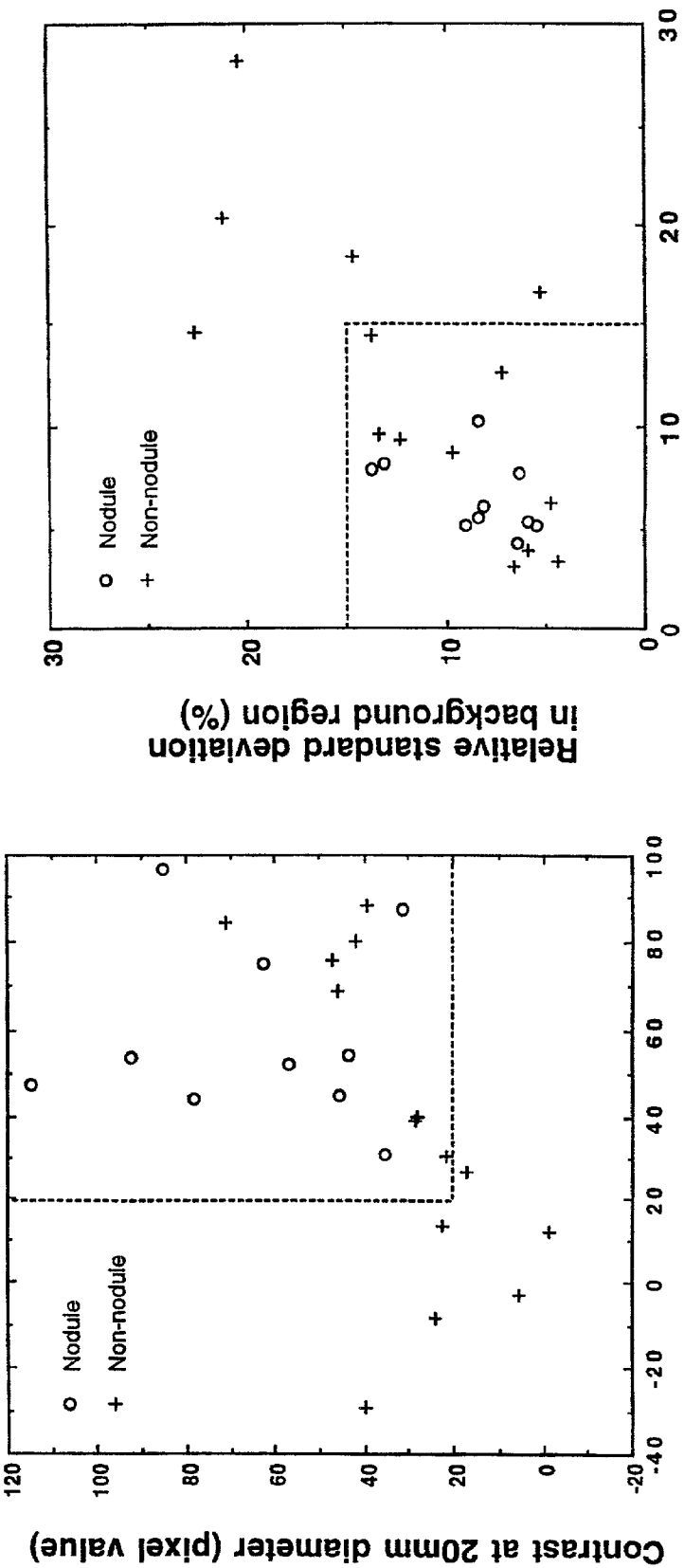
FIG. 10 is a graph showing a distribution of contrasts of nodule candidates at 10 mm and 20 mm diameters for nodules and non-nodules.
FIG. 11 is a graph showing a distribution of relative standard deviations for nodule candidates in object and background regions at 10 mm diameter for nodules and non-nodules.

In contralateral subtraction images, when ribs in one lung match with those in another lung, ribs are generally eliminated and thus have uniform density which is the same as the adjacent background, and nodules appear as dark round patterns. Therefore, false positive computer output due to ribs can be identified, if image features associated with a computer detected candidate would match those of ribs. The contrast of the candidate as an image feature to distinguish between nodules and false positives due to ribs was employed (step S1000). The contrast is defined here as the difference in the average pixel values between the central area of the candidate and the immediately adjacent background area. The average pixel value in the central area of the candidate was empirically determined over a circle with a diameter d, whereas the average pixel value in the background area was determined over a doughnut shape area with the inner diameter of d and the outer diameter of 2d. The contrasts of all candidates including nodules and non-nodules (false positives) were determined, for example, over a wide range of the diameter d from 2 mm to 40 mm. It was found that the contrasts of nodules in contralateral subtraction images tend to be generally greater than those of non-nodules. For example, FIG. 10 shows that the contrasts of nodules at 10 mm and 20 mm diameters are greater than 20 pixel values (dotted line), whereas there are six non-nodules with low contrast below 20 pixel values. Therefore, this result indicates that six false positives can be removed from the list of the computer output indicating the potential sites of lung nodules, if the nodule candidates in contralateral subtraction images, which contain the contrast less than a predetermined threshold level such as 20 pixel values, would be eliminated.

However, there are eight non-nodules with large contrasts which are comparable to the contrasts of ten nodules. It was found that the large contrast for some non-nodules was caused by misregistration artifacts in contralateral subtraction images. Since the patterns due to misregistration artifacts generally include localized mixture of light and dark densities, it is expected that the standard deviation of pixel values in the central area and/or the background area would be large compared to those areas without misregistration artifacts. FIG. 11 shows the relative standard deviations in the central and the background area. The relative standard deviation was determined by the ratio of the standard deviation of pixel value variation to the average pixel value in the central area and/or the background area. It is apparent in FIG. 11 that the relative standard deviation for nodules are relatively small, but there are five non-nodules with large relative standard deviations above 15% (dotted line), which were due to misregistration artifacts. Therefore, this result illustrates that five false positives can be removed if the relative standard deviation of a nodule candidate in contralateral subtraction image would have a large value above a predetermined threshold level (step S1100). By combining the results in FIGS. 10 and 11, ten out of 14 false positives can be eliminated, since there is one "overlapped" false positive which can be removed either in FIG. 10 or FIG. 11.

Figures 12, 13:
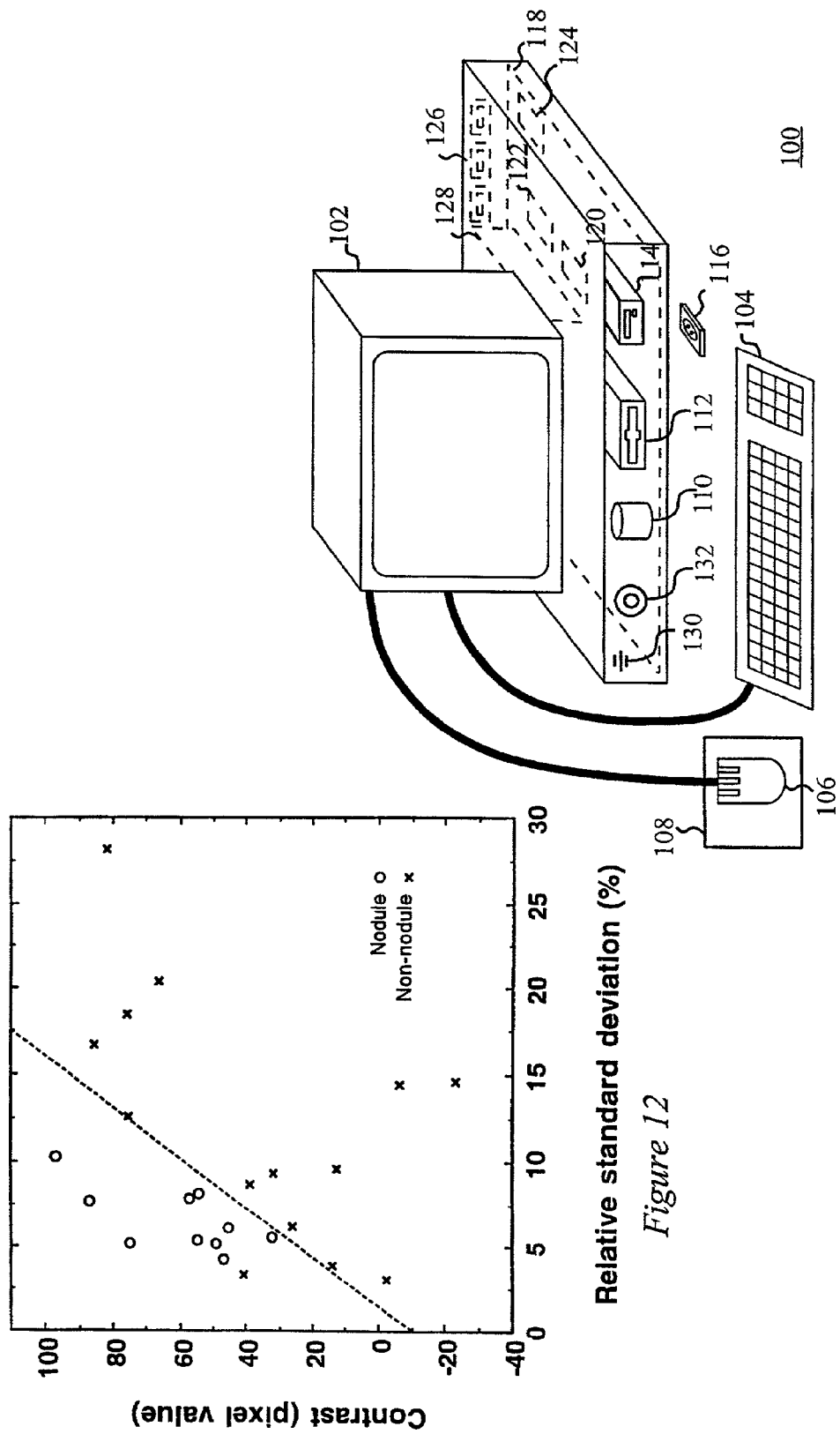
FIG. 12 is a graph showing a relationship between contrast and relative standard deviation at 10 mm diameter for nodules and non-nodules.
FIG. 13 is a schematic illustration of a general purpose computer 100 programmed according to the teachings of the present invention.

Another method for elimination of false positives is illustrated in FIG. 12, where the correlation between the contrast and the relative standard deviation of the central areas of the nodules is demonstrated. It is apparent in FIG. 12 that nodules tend to have large contrasts and small standard deviations, whereas non-nodules tend to have small contrasts or large contrasts with large relative standard deviations. Therefore, when a contrast versus standard deviation threshold as indicated by the dotted line is employed, 13 out of 14 false positives can be eliminated (step S1200–S1300). This result indicates that a large number of false positives can be eliminated and thus can improve substantially the performance of the computerized scheme for detection of lung nodules in chest images by employing contralateral subtraction images.

FIG. 13 is a schematic illustration of a computer system for detection of asymmetric abnormalities in a single chest radiograph. A computer 100 implements the method of the present invention, wherein the computer includes, for example, a display device 102, such as a touch screen monitor with a touch-screen interface, a keyboard 104, a pointing device 106, a mouse pad or digitizing pad 108, a hard disk 110, or other fixed, high density media drives, connected using an appropriate device bus (e.g., a SCSI bus, an Enhanced IDE bus, an Ultra DMA bus, a PCI bus, etc.), a floppy drive 112, a tape or CD ROM drive 114 with tape or CD media 116, or other removable media devices, such as magneto-optical media, etc., and a mother board 118. The mother board 118 includes, for example, a processor 120, a RAM 122, and a ROM 124 (e.g., DRAM, ROM, EPROM, EEPROM, SRAM, SDRAM, and Flash RAM, etc.), I/O ports 126 which may be used to couple to an image acquisition device (not shown), and optional special purpose logic devices (e.g., ASICs) or configurable logic devices (e.g., GAL and reprogrammable FPGA) 128 for performing specialized hardware/software functions, such as sound processing, image processing, signal processing, neural network processing, etc., a microphone 130, and a speaker or speakers 132.

As stated above, the system includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for performing any of the processes according to the present invention, described above (see, e.g., FIGS. 1(a)–(c)). The computer code devices of the present invention can be any interpreted or executable code mechanism, including but not limited to scripts, interpreters, dynamic link libraries, Java classes, and complete executable programs, etc.

The programming of general purpose computer 100 may include a software module for digitizing and storing images obtained from an image acquisition device (not shown). Alternatively, the present invention can also be implemented to process digital data derived from images obtained by other means, such as a picture archive communication system (PACS). In other words, often the digital images being processed will be in existence in digital form and need not be converted to digital form in practicing the invention.

The invention may also be implemented by the preparation of application specific integrated circuits or by interconnecting an appropriate network of conventional component circuits, as will be readily apparent to those skilled in the art.

In addition, although the present invention is defined in terms of eliminating false positives in candidate nodules, based on contrast, relative standard deviation, and/or correlation between the contrast and the relative standard deviation of the central and/or background areas of the nodules, other image features and/or other areas of the nodules can be used, as will be readily apparent to those skilled in the art.

Recapitulating, according to the present invention, a novel contralateral subtraction technique for the detection of asymmetric opacities on single chest radiograph has been developed, and the three techniques (i.e., lateral inclination correction, exclusion of cardiac region, and separate fitting of shift values for left and right lungs) to improve the contralateral subtraction image have been applied. The contralateral subtraction technique can remove most of peripheral ribs, and thus enhance low-contrast peripheral lesions on chest radiographs. It is believed that this technique can assist radiologists in the detection of subtle lung opacities.

Obviously, numerous modifications and variations of the present invention are possible in light of the above teachings. It is therefore to be understood that within the scope of the appended claims, the invention may be practiced otherwise than as specifically described herein.

APPENDIX

[1] A. Kano, K. Doi, H. MacMahon, D. D. Hassel, M. Giger, "Digital image subtraction of temporally sequential chest images for detection of interval change," Med. Phys. 21, 453–461 (1994); and U.S. Pat. No. 5,359,513.

[2] M. C. Difazio, H. MacMahon, X. W. Xu, P. Tsai, J. Shiraishi, S. G. Armato III, K. Doi, "Digital chest radiology: Effect of temporal subtraction images on detection accuracy," Radiology 202, 447–452 (1997).

[3] J. Shiraishi, S. Katsuragawa, J. Ikezoe, T. Matsumoto, T. Kobayashi, K. Doi, et al, "Development of digital image database for chest radiographs with lung nodules: Evaluation by ROC analysis". Radiology 205(p), 394, 1997.

[4] X. W. Xu, K. Doi, "Image feature analysis for computer-aided diagnosis: Accurate determination of ribcage boundary in chest radiographs," Med. Phys. 22, 617–626 (1995); and U.S. Pat. No. 5,790,690.

[5] T. Ishida, S. Katsuragawa, K. Nakamura, H. MacMahon, K. Doi, "Iterative image warping technique for temporal subtraction of sequential chest radiographs to detect interval change," submitted to Med. Phys; and U.S. patent application Ser. No. 09/053,789.

[6] T. Ishida, K. Ashizawa, R. Engelman, S. Katsuragawa, H. MacMahon, K. Doi, "Application of temporal subtraction for detection of interval change in chest radiographs: Improvement of subtraction images using automatic initial image matching," submitted to Journal of Digital Imaging; and U.S. patent application Ser. No. 08/900,362.

[7] N. Nakamori, K. Doi, V. Sabeti, H. MacMahon, "Image feature analysis and computer-aided diagnosis in digital radiography: Automated analysis of sizes of heart and lung in digital chest images," Med. Phys. 17, 342–350 (1990); and U.S. Pat. No. 5,072,384.

[8] X. W. Xu, K. Doi, T. Kobayashi, H. Macmahon, M. L. Giger, "Development of an improved CAD scheme for automated detection of lung nodules in digital chest images", Med. Phys. 24, 1395–1403 (1997); and U.S. patent application Ser. No. 08/562,087 and other relevant patents and patent applications (U.S. Pat. Nos. 4,907,156; 5,224,177; 5,289,374; and patent application Ser. Nos. 08/757,611; 08/900,191; 09/027,685).

The invention claimed is:

1. In a method of computerized processing of chest images, the improvement comprising:
   obtaining a digital first image of a chest;
   producing a second image which is a mirror image of the first image;
   performing image warping on one of the first and second images to produce a warped image which is registered to the other of said first and second images; and
   subtracting the warped image from the other image to generate a subtraction image.

2. The method of claim 1, further comprising:
   displaying the subtraction image.

3. The method of claim 1, wherein said step of obtaining a digital first image comprises:
   obtaining a digital original image; and
   performing lateral inclination correction on the original image to generate said first image, comprising,
   detecting ribcage edges on both sides of the lungs in the original image,
   determining average horizontal locations of the left and right ribcage edges at plural vertical locations,
   fitting the determined average horizontal locations to a straight line to derive a midline, rotating the original image so that the midline is vertical, and
   shifting the rotated image to produce said first image with the midline centered in said first image.

4. The method of claim 3, wherein said step of performing image warping comprises:
   performing global matching to align the lung areas of the one image to the other image;
   performing local matching of selected regions of interest in the right and left lungs of said one image to the right and left lungs of the other image to generate shift values for pixels of said one image;
   performing surface fitting on the shift values of the right lung of the one image and independently performing surface fitting of shift values of the left lung of the one image to smooth the shift values and generate fitted shift values for the left and right lungs of the one image;
   shifting pixels of the one image using the fitted shift values.

5. The method of claim 1, further comprising:
   producing an enhanced subtraction image, including:
   enhancing contrast of the lung regions of the subtraction image;
   adding a predetermined pixel value to the pixel values of the lung regions of the subtraction image;
   maintaining pixels of regions other than the lung regions of the subtraction image at one of,
   (1) a constant pixel value to generate a uniform background, and
   (2) at the values of corresponding pixels in one of the first and second images; and displaying the enhanced subtraction image.

6. The method of claim 4, further comprising: producing an enhanced subtraction image, including:
   enhancing contrast of the lung regions of the subtraction image;
   adding a predetermined pixel value to the pixel values of the lung regions of the subtraction image;
   maintaining pixels of regions other than the lung regions of the subtraction image at one of,
   (1) a constant pixel value to generate a uniform background, and
   (2) at the values of corresponding pixels in one of the first and second images; and displaying the enhanced subtraction image.

7. The method of claim 4, wherein the step of performing image warping comprises:
   reducing by a predetermined factor the matrix size of the first and second images prior to performing global matching;
   scaling fitted shift values by the predetermined factor for application of the scaled fitted shift values to pixels of said one image;
   shifting pixels of said one image using the scaled fitted shift values; displaying the subtraction image.

8. The method of claim 6, wherein the step of performing image warping comprises:
   reducing by a predetermined factor the matrix size of the first and second images prior to performing global matching;
   scaling fitted shift values by the predetermined factor for application of the scaled fitted shift values to pixels of said one image;
   shifting pixels of said one image using the scaled fitted shift values;
   displaying the subtraction image.

9. The method of claim 1, further comprising:
   locating locations of candidate abnormalities in the subtraction image;
   extracting at least one predetermined feature from each candidate abnormality;
   comparing each extracted feature with a predetermined threshold; and
   removing from consideration false positive locations having an extracted feature which bears a predetermined relationship with respect to said predetermined threshold.

10. The method of claim 9, wherein said extracting step comprises:
    extracting at least one of contrast, standard deviation, and correlation between contrast and standard deviation at the locations of the candidate abnormalities in the subtraction image.

11. The method of claim 10, wherein contrast and standard deviation are extracted.

12. The method of claim 10, wherein contrast and correlation are extracted.

13. The method of claim 10, wherein standard deviation and correlation are extracted.

14. The method of claim 11, wherein correlation is extracted.

15. The method of claim 14, comprising:
    displaying at least one of said first, second and subtraction images with locations of candidate abnormalities under consideration identified in the displayed image.

16. The method of claim 3, further comprising:
    locating locations of candidate abnormalities in the subtraction image;
    extracting at least one predetermined feature from each candidate abnormality;
    comparing each extracted feature with a predetermined threshold; and removing from consideration false positive locations having an extracted feature which bears a predetermined relationship with respect to said predetermined threshold.

17. The method of claim 16, wherein said extracting step comprises:
extracting at least one of contrast, standard deviation, and correlation between contrast and standard deviation at the locations of the candidate abnormalities in the subtraction image.

18. The method of claim 17, wherein contrast and standard deviation are extracted.

19. The method of claim 17, wherein contrast and correlation are extracted.

20. The method of claim 17, wherein standard deviation and correlation are extracted.

21. The method of claim 18, wherein correlation is extracted.

22. The method of claim 21, comprising:
displaying at least one of said original, first, second and subtraction images with locations of candidate abnormalities under consideration identified in the displayed image.

23. The method of claim 6, further comprising:
locating locations of candidate abnormalities in the subtraction image;
extracting at least one predetermined feature from each candidate abnormality;
comparing each extracted feature with a predetermined threshold; and
removing from consideration false positive locations having an extracted feature which bears a predetermined relationship with respect to said predetermined threshold.

24. The method of claim 23, wherein said extracting step comprises:
extracting at least one of contrast, standard deviation, and correlation between contrast and standard deviation at the locations of the candidate abnormalities in the subtraction image.

25. The method of claim 24, wherein contrast and standard deviation are extracted.

26. The method of claim 24, wherein contrast and correlation are extracted.

27. The method of claim 24, wherein standard deviation and correlation are extracted.

28. The method of claim 25, wherein correlation is extracted.

29. The method of claim 28, comprising:
displaying at least one of said original, first, second and subtraction images with locations of candidate abnormalities under consideration identified in the displayed image.

30. In a method for computerized processing of at least one chest image, the improvement comprising:
obtaining a digital first image of a chest of a subject;
detecting ribcage edges on both sides of the lungs in said first chest image;
determining average horizontal locations of the left and right ribcage edges at plural vertical locations;
fitting the determined average horizontal locations to a straight line to derive a midline; rotating the chest image so that the midline is vertical; and
shifting the rotated image to produce a lateral inclination corrected second image with the midline centered in said lateral inclination corrected image.

31. The method of claim 30, further comprising:
obtaining a temporally separated digital third image of the chest of the same subject; detecting ribcage edges on both sides of the lungs in said third image;
determining average horizontal locations of the left and right ribcage edges at plural vertical locations in said third image;
fitting the determined average horizontal locations to a straight line to derive a midline in said third image;
rotating the third image so that the mid line detected in said third image is vertical;
shifting the rotated image to produce a lateral inclination corrected fourth image with the midline centered in said fourth image; and
performing image warping on one of the second and fourth images to produce a warped image which is registered to the other of said second and fourth images; and
subtracting the warped image from the other image to generate a subtraction image.

32. The method of claim 31, comprising:
displaying at least one of the first through fourth and subtraction images.

33. The method of claim 30, wherein said step of performing image warping comprises:
performing global matching to align the lung areas of the one image to the other image;
performing local matching of selected regions of interest in the right and left lungs of said one image to the right and left lungs of the other image to generate shift values for pixels of said one image;
performing surface fitting on the shift values of the right lung of the one image and independently performing surface fitting of shift values of the left lung of the one image to smooth the shift values and generate fitted shift values for the left and right lungs of the one image;
shifting pixels of the one image using the fitted shift values.

34. The method of claim 31, further comprising:
producing an enhanced subtraction image, including:
enhancing contrast of the lung regions of the subtraction image;
adding a predetermined pixel value to the pixel values of the lung regions of the subtraction image;
maintaining pixels of regions other than the lung regions of the subtraction image at one of,
(1) a constant pixel value to generate a uniform background, and
(2) at the values of corresponding pixels in one of the first, second, third and fourth images; and
displaying the enhanced subtraction image.

35. The method of claim 33, further comprising:
producing an enhanced subtraction image, including:
enhancing contrast of the lung regions of the subtraction image;
adding a predetermined pixel value to the pixel values of the lung regions of the subtraction image;
maintaining pixels of regions other than the lung regions of the subtraction image at one of,
(1) a constant pixel value to generate a uniform background, and
(2) at the values of corresponding pixels in one of the first, second, third and fourth images; and
displaying the enhanced subtraction image.

36. The method of claim 33, wherein the step of performing image warping comprises:
reducing by a predetermined factor the matrix size of the first and second images prior to performing global matching;
scaling fitted shift values by the predetermined factor for application of the scaled fitted shift values to pixels of said one image;
shifting pixels of said one image using the scaled fitted shift values;
displaying the subtraction image.

37. The method of claim 35, wherein the step of performing image warping comprises:
reducing by a predetermined factor the matrix size of the first and second images prior to performing global matching;
scaling fitted shift values by the predetermined factor for application of the scaled fitted shift values to pixels of said one image;
shifting pixels of said one image using the scaled fitted shift values; displaying the subtraction image.

38. The method of claim 31, further comprising:
locating locations of candidate abnormalities in the subtraction image;
extracting at least one predetermined feature from each candidate abnormality;
comparing each extracted feature with a predetermined threshold; and
removing from consideration false positive locations having an extracted feature which bears a predetermined relationship with respect to said predetermined threshold.

39. The method of claim 38, wherein said extracting step comprises:
extracting at least one of contrast, standard deviation, and correlation between contrast and standard deviation at the locations of the candidate abnormalities in the subtraction image.

40. The method of claim 39, wherein contrast and standard deviation are extracted.

41. The method of claim 39, wherein contrast and correlation are extracted.

42. The method of claim 39, wherein standard deviation and correlation are extracted.

43. The method of claim 40, wherein correlation is extracted.

44. The method of claim 43, comprising:
displaying at least one of said first, second, third, fourth and subtraction images with locations of candidate abnormalities under consideration identified in the displayed image.

45. The method of claim 33, further comprising:
locating locations of candidate abnormalities in the subtraction image;
extracting at least one predetermined feature from each candidate abnormality;
comparing each extracted feature with a predetermined threshold; and
removing from consideration false positive locations having an extracted feature which bears a predetermined relationship with respect to said predetermined threshold.

46. The method of claim 45, wherein said extracting step comprises:
extracting at least one of contrast, standard deviation, and correlation between contrast and standard deviation at the locations of the candidate abnormalities in the subtraction image.

47. The method of claim 46, wherein contrast and standard deviation are extracted.

48. The method of claim 46, wherein contrast and correlation are extracted.

49. The method of claim 46, wherein standard deviation and correlation are extracted.

50. The method of claim 47, wherein correlation is extracted.

51. The method of claim 50, comprising:
displaying at least one of said first, second and subtraction images with locations of candidate abnormalities under consideration identified in the displayed image.

52. The method of claim 38, further comprising:
locating locations of candidate abnormalities in the subtraction image;
extracting at least one predetermined feature from each candidate abnormality; comparing each extracted feature with a predetermined threshold; and
removing from consideration false positive locations having an extracted feature which bears a predetermined relationship with respect to said predetermined threshold.

53. The method of claim 52, wherein said extracting step comprises:
extracting at least one of contrast, standard deviation, and correlation between contrast and standard deviation at the locations of the candidate abnormalities in the subtraction image.

54. The method of claim 53, wherein contrast and standard deviation are extracted.

55. The method of claim 53, wherein contrast and correlation are extracted.

56. The method of claim 53, wherein standard deviation and correlation are extracted.

57. The method of claim 54, wherein correlation is extracted.

58. The method of claim 57, comprising:
displaying at least one of said first, second, third, fourth and subtraction images with locations of candidate abnormalities under consideration identified in the displayed image.

59. An image processing system, comprising:
a mechanism configured to obtain a digital first image of a chest;
a mechanism configured to produce a second image which is a mirror image of the first image;
a mechanism configured to perform image warping on one of the first and second images to produce a warped image which is registered to the other of said first and second images; and
a mechanism configured to subtract the warped image from the other image to generate a subtraction image.

60. A storage medium storing a program for performing the steps of:
obtaining a digital first image of a chest;
producing a second image which is a mirror image of the first image;
performing image warping on one of the first and second images to produce a warped image which is registered to the other of said first and second images; and subtracting the warped image from the other image to generate a subtraction image.

61. The system of claim 59, further comprising:
a mechanism configured to display the subtraction image.

62. The system of claim 59, wherein said mechanism configured to obtain a digital first image comprises:
a mechanism configured to obtain a digital original image; and
a mechanism configured to perform lateral inclination correction on the original image to generate said first image, comprising,
a mechanism configured to detect ribcage edges on both sides of the lungs in the original image,
a mechanism configured to determine average horizontal locations of the left and right ribcage edges at plural vertical locations,
a mechanism configured to fit the determined average horizontal locations to a straight line to derive a midline, rotating the original image so that the midline is vertical, and
a mechanism configured to shift the rotated image to produce said first image with the midline centered in said first image.

63. The system of claim 61, wherein said mechanism configured to perform image warping comprises:
a mechanism configured to perform global matching to align the lung areas of the one image to the other image;
a mechanism configured to perform local matching of selected regions of interest in the right and left lungs of said one image to the right and left lungs of the other image to generate shift values for pixels of said one image;
a mechanism configured to perform surface fitting on the shift values of the right lung of the one image and independently performing surface fitting of shift values of the left lung of the one image to smooth the shift values and generate fitted shift values for the left and right lungs of the one image;
a mechanism configured to shift pixels of the one image using/the fitted shift values.

64. The system of claim 59, further comprising: a mechanism configured to produce an enhanced subtraction image, including:
a mechanism configured to enhance contrast of the lung regions of the subtraction image;
a mechanism configured to add a predetermined pixel value to the pixel values of the lung regions of the subtraction image;
a mechanism configured to maintain pixels of regions other than the lung regions of the subtraction image at one of,
(1) a constant pixel value to generate a uniform background, and
(2) at the values of corresponding pixels in one of the first and second images; and
a mechanism configured to display the enhanced subtraction image.

65. The system of claim 62, further comprising: a mechanism configured to produce an enhanced subtraction image, including:
a mechanism configured to enhance contrast of the lung regions of the subtraction image;
a mechanism configured to add a predetermined pixel value to the pixel values of the lung regions of the subtraction image;
a mechanism configured to maintain pixels of regions other than the lung regions of the subtraction image at one of,
(1) a constant pixel value to generate a uniform background, and
(2) at the values of corresponding pixels in one of the first and second images; and
a mechanism configured to display the enhanced subtraction image.

66. The system of claim 62, wherein the mechanism configured to perform image warping comprises:
a mechanism configured to reduce by a predetermined factor the matrix size of the first and second images prior to performing global matching;
a mechanism configured to scale fitted shift values by the predetermined factor for application of the scaled fitted shift values to pixels of said one image;
a mechanism configured to shift pixels of said one image using the scaled fitted shift values; displaying the subtraction image.

67. The system of claim 64, wherein the mechanism configured to perform image warping comprises:
a mechanism configured to reduce by a predetermined factor the matrix size of the first and second images prior to performing global matching;
a mechanism configured to scale fitted shift values by the predetermined factor for application of the scaled fitted shift values to pixels of said one image;
a mechanism configured to shift pixels of said one image using the scaled fitted shift values;
a mechanism configured to display the subtraction image.

68. The system of claim 59, further comprising:
a mechanism configured to locate locations of candidate abnormalities in the subtraction image;
a mechanism configured to extract at least one predetermined feature from each candidate abnormality;
a mechanism configured to compare each extracted feature with a predetermined threshold; and
a mechanism configured to remove from consideration false positive locations having an extracted feature which bears a predetermined relationship with respect to said predetermined threshold.

69. The system of claim 67, wherein said mechanism configured to extract comprises:
a mechanism configured to extract at least one of contrast, standard deviation, and correlation between contrast and standard deviation at the locations of the candidate abnormalities in the subtraction image.

70. The system of claim 68, wherein the mechanism configured to extract is configured to extract contrast and standard deviation.

71. The system of claim 68, wherein the mechanism configured to extract is configured to extract contrast and correlation.

72. The system of claim 68, wherein the mechanism configured to extract is configured to extract standard deviation and correlation.

73. The system of claim 69, wherein the mechanism configured to extract is configured to extract correlation.

74. The system of claim 72, comprising:
a mechanism configured to display at least one of said first, second and subtraction images with locations of candidate abnormalities under consideration identified in the displayed image.

75. The system of claim 61, further comprising:
a mechanism configured to locate locations of candidate abnormalities in the subtraction image;

a mechanism configured to extract at least one predetermined feature from each candidate abnormality;

a mechanism configured to compare each extracted feature with a predetermined threshold; and a mechanism configured to remove from consideration false positive locations having an extracted feature which bears a predetermined relationship with respect to said predetermined threshold.

76. The system of claim 74, wherein said mechanism configured to extract comprises:

a mechanism configured to extract at least one of contrast, standard deviation, and correlation between contrast and standard deviation at the locations of the candidate abnormalities in the subtraction image.

77. The system of claim 75, wherein the mechanism configured to extract is configured to extract contrast and standard deviation.

78. The system of claim 75, wherein the mechanism configured to extract is configured to extract contrast and correlation.

79. The system of claim 75, wherein the mechanism configured to extract is configured to extract standard deviation and correlation.

80. The system of claim 76, wherein the mechanism configured to extract is configured to extract correlation.

81. The system of claim 79, comprising:

a mechanism configured to display at least one of said original, first, second and subtraction images with locations of candidate abnormalities under consideration identified in the displayed image.

82. The system of claim 64, further comprising:

a mechanism configured to locate locations of candidate abnormalities in the subtraction image;

a mechanism configured to extract at least one predetermined feature from each candidate abnormality;

a mechanism configured to compare each extracted feature with a predetermined threshold; and a mechanism configured to remove from consideration false positive locations having an extracted feature which bears a predetermined relationship with respect to said predetermined threshold.

83. The system of claim 81, wherein said mechanism configured to extract comprises:

a mechanism configured to extract at least one of contrast, standard deviation, and correlation between contrast and standard deviation at the locations of the candidate abnormalities in the subtraction image.

84. The system of claim 82, wherein the mechanism configured to extract is configured to extract contrast and standard deviation.

85. The system of claim 82, wherein the mechanism configured to extract is configured to extract contrast and correlation.

86. The system of claim 82, wherein the mechanism configured to extract is configured to extract standard deviation and correlation.

87. The system of claim 83, wherein the mechanism configured to extract is configured to extract correlation.

88. The system of claim 86, comprising:

a mechanism configured to display at least one of said original, first, second and subtraction images with locations of candidate abnormalities under consideration identified in the displayed image.

89. An image processing system, comprising:

a mechanism configured to obtain a digital first image of a chest of a subject;

a mechanism configured to detect ribcage edges on both sides of the lungs in said first chest image;

a mechanism configured to determine average horizontal locations of the left and right ribcage edges at plural vertical locations;

a mechanism configured to fit the determined average horizontal locations to a straight line to derive a midline;

a mechanism configured to rotate the chest image so that the midline is vertical; and a mechanism configured to shift the rotated image to produce a lateral inclination corrected second image with the midline centered in said lateral inclination corrected image.

90. The system of claim 89, further comprising:

a mechanism configured to obtain a temporally separated digital third image of the chest of the same subject;

a mechanism configured to detect ribcage edges on both sides of the lungs in said third image;

a mechanism configured to determine average horizontal locations of the left and right ribcage edges at plural vertical locations in said third image;

a mechanism configured to fit the determined average horizontal locations to a straight line to derive a midline in said third image;

a mechanism configured to rotate the third image so that the mid line detected in said third image is vertical;

a mechanism configured to shift the rotated image to produce a lateral inclination corrected fourth image with the midline centered in said fourth image; and a mechanism configured to perform image warping on one of the second and fourth images to produce a warped image which is registered to the other of said second and fourth images; and a mechanism configured to subtract the warped image from the other image to generate a subtraction image.

91. The system of claim 90, comprising:

a mechanism configured to display at least one of the first through fourth and subtraction images.

92. The system of claim 89, wherein said mechanism configured to perform image warping comprises:

a mechanism configured to perform global matching to align the lung areas of the one image to the other image;

a mechanism configured to perform local matching of selected regions of interest in the right and left lungs of said one image to the right and left lungs of the other image to generate shift values for pixels of said one image;

a mechanism configured to perform surface fitting on the shift values of the right lung of the one image and independently performing surface fitting of shift values of the left lung of the one image to smooth the shift values and generate fitted shift values for the left and right lungs of the one image;

a mechanism configured to shift pixels of the one image using the fitted shift values.

93. The system of claim 90, further comprising:

a mechanism configured to produce an enhanced subtraction image, including: enhancing contrast of the lung regions of the subtraction image;

a mechanism configured to add a predetermined pixel value to the pixel values of the lung regions of the subtraction image;

a mechanism configured to maintain pixels of regions other than the lung regions of the subtraction image at one of, (1) a constant pixel value to generate a uniform background, and
(2) at the values of corresponding pixels in one of the first, second, third and fourth images; and
a mechanism configured to display the enhanced subtraction image.

94. The system of claim 92, further comprising:
a mechanism configured to produce an enhanced subtraction image, including: a mechanism configured to enhance contrast of the lung regions of the subtraction image;
a mechanism configured to add a predetermined pixel value to the pixel values of the lung regions of the subtraction image;
a mechanism configured to maintain pixels of regions other than the lung regions of the subtraction image at one of,
(1) a constant pixel value to generate a uniform background, and
(2) at the values of corresponding pixels in one of the first, second, third and fourth images; and
a mechanism configured to display the enhanced subtraction image.

95. The system of claim 92, wherein the mechanism configured to perform image warping comprises:
a mechanism configured to reduce by a predetermined factor the matrix size of the first and second images prior to performing global matching;
a mechanism configured to scale fitted shift values by the predetermined factor for application of the scaled fitted shift values to pixels of said one image;
a mechanism configured to shift pixels of said one image using the scaled fitted shift values;
a mechanism configured to display the subtraction image.

96. The system of claim 94, wherein the mechanism configured to perform image warping comprises:
a mechanism configured to reduce by a predetermined factor the matrix size of the first and second images prior to performing global matching;
a mechanism configured to scale fitted shift values by the predetermined factor for application of the scaled fitted shift values to pixels of said one image;
a mechanism configured to shift pixels of said one image using the scaled fitted shift values; and
a mechanism configured to display the subtraction image.

97. The system of claim 90, further comprising:
a mechanism configured to locate locations of candidate abnormalities in the subtraction image;
a mechanism configured to extract at least one predetermined feature from each candidate abnormality;
a mechanism configured to compare each extracted feature with a predetermined threshold; and
a mechanism configured to remove from consideration false positive locations having an extracted feature which bears a predetermined relationship with respect to said predetermined threshold.

98. The system of claim 97, wherein said mechanism configured to extract comprises:
a mechanism configured to extract at least one of contrast, standard deviation, and correlation between contrast and standard deviation at the locations of the candidate abnormalities in the subtraction image.

99. The system of claim 98, wherein the mechanism configured to extract is configured to extract contrast and standard deviation.

100. The system of claim 98, wherein the mechanism configured to extract is configured to extract contrast and correlation.

101. The system of claim 98, wherein the mechanism configured to extract is configured to extract standard deviation and correlation.

102. The system of claim 99, wherein the mechanism configured to extract is configured to extract correlation.

103. The system of claim 102, comprising:
a mechanism configured to display at least one of said first, second, third, fourth and subtraction images with locations of candidate abnormalities under consideration identified in the displayed image.

104. The system of claim 92, further comprising:
a mechanism configured to locate locations of candidate abnormalities in the subtraction image;
a mechanism configured to extract at least one predetermined feature from each candidate abnormality;
a mechanism configured to compare each extracted feature with a predetermined threshold; and
a mechanism configured to remove from consideration false positive locations having an extracted feature which bears a predetermined relationship with respect to said predetermined threshold.

105. The system of claim 104, wherein said mechanism configured to extract comprises:
a mechanism configured to extract at least one of contrast, standard deviation, and correlation between contrast and standard deviation at the locations of the candidate abnormalities in the subtraction image.

106. The system of claim 105, wherein the mechanism configured to extract is configured to extract contrast and standard deviation.

107. The system of claim 105, wherein the mechanism configured to extract is configured to extract contrast and correlation.

108. The system of claim 105, wherein the mechanism configured to extract is configured to extract standard deviation and correlation.

109. The system of claim 106, wherein the mechanism configured to extract is configured to extract correlation.

110. The system of claim 109, comprising:
a mechanism configured to display at least one of said first, second and subtraction images with locations of candidate abnormalities under consideration identified in the displayed image.

111. The system of claim 97, further comprising:
a mechanism configured to locate locations of candidate abnormalities in the subtraction image;
a mechanism configured to extract at least one predetermined feature from each candidate abnormality; comparing each extracted feature with a predetermined threshold; and
a mechanism configured to remove from consideration false positive locations having an extracted feature which bears a predetermined relationship with respect to said predetermined threshold.

112. The system of claim 111, wherein said mechanism configured to extract comprises:
a mechanism configured to extract at least one of contrast, standard deviation, and correlation between contrast and standard deviation at the locations of the candidate abnormalities in the subtraction image.

113. The system of claim 112, wherein the mechanism configured to extract is configured to extract contrast and standard deviation.

114. The system of claim 112, wherein the mechanism configured to extract is configured to extract contrast and correlation.

115. The system of claim 112, wherein the mechanism configured to extract is configured to extract standard deviation and correlation.

116. The system of claim 113, wherein the mechanism configured to extract is configured to extract correlation.

117. The system of claim 116, comprising:
a mechanism configured to display at least one of said first, second, third, fourth and subtraction images with locations of candidate abnormalities under consideration identified in the displayed image.

118. The storage medium of claim 60, further comprising: displaying the subtraction image.

119. The storage medium of claim 60, wherein said step of obtaining a digital first image comprises:
obtaining a digital original image; and
performing lateral inclination correction on the original image to generate said first image, comprising,
detecting ribcage edges on both sides of the lungs in the original image,
determining average horizontal locations of the left and right ribcage edges at plural vertical locations,
fitting the determined average horizontal locations to a straight line to derive a midline, rotating the original image so that the midline is vertical, and
shifting the rotated image to produce said first image with the midline centered in said first image.

120. The storage medium of claim 119, wherein said step of performing image warping comprises:
performing global matching to align the lung areas of the one image to the other image;
performing local matching of selected regions of interest in the right and left lungs of said one image to the right and left lungs of the other image to generate shift values for pixels of said one image;
performing surface fitting on the shift values of the right lung of the one image and independently performing surface fitting of shift values of the left lung of the one image to smooth the shift values and generate fitted shift values for the left and right lungs of the one image;
shifting pixels of the one image using the fitted shift values.

121. The storage medium of claim 60, further comprising:
producing an enhanced subtraction image, including:
enhancing contrast of the lung regions of the subtraction image;
adding a predetermined pixel value to the pixel values of the lung regions of the subtraction image;
maintaining pixels of regions other than the lung regions of the subtraction image at one of,
(1) a constant pixel value to generate a uniform background, and
(2) at the values of corresponding pixels in one of the first and second images; and displaying the enhanced subtraction image.

122. The storage medium of claim 120, further comprising: producing an enhanced subtraction image, including:
enhancing contrast of the lung regions of the subtraction image;
adding a predetermined pixel value to the pixel values of the lung regions of the subtraction image;
maintaining pixels of regions other than the lung regions of the subtraction image at one of,
(1) a constant pixel value to generate a uniform background, and
(2) at the values of corresponding pixels in one of the first and second images; and displaying the enhanced subtraction image.

123. The storage medium of claim 120, wherein the step of performing image warping comprises:
reducing by a predetermined factor the matrix size of the first and second images prior to performing global matching;
scaling fitted shift values by the predetermined factor for application of the scaled fitted shift values to pixels of said one image;
shifting pixels of said one image using the scaled fitted shift values; displaying the subtraction image.

124. The storage medium of claim 122, wherein the step of performing image warping comprises:
reducing by a predetermined factor the matrix size of the first and second images prior to performing global matching;
scaling fitted shift values by the predetermined factor for application of the scaled fitted shift values to pixels of said one image;
shifting pixels of said one image using the scaled fitted shift values;
displaying the subtraction image.

125. The storage medium of claim 60, further comprising:
locating locations of candidate abnormalities in the subtraction image;
extracting at least one predetermined feature from each candidate abnormality;
comparing each extracted feature with a predetermined threshold; and
removing from consideration false positive locations having an extracted feature which bears a predetermined relationship with respect to said predetermined threshold.

126. The storage medium of claim 125, wherein said extracting step comprises:
extracting at least one of contrast, standard deviation, and correlation between contrast and standard deviation at the locations of the candidate abnormalities in the subtraction image.

127. The storage medium of claim 126, wherein contrast and standard deviation are extracted.

128. The storage medium of claim 126, wherein contrast and correlation are extracted.

129. The storage medium of claim 126, wherein standard deviation and correlation are extracted.

130. The storage medium of claim 127, wherein correlation is extracted.

131. The storage medium of claim 130, comprising:
displaying at least one of said first, second and subtraction images with locations of candidate abnormalities under consideration identified in the displayed image.

132. The storage medium of claim 119, further comprising:
locating locations of candidate abnormalities in the subtraction image;
extracting at least one predetermined feature from each candidate abnormality;
comparing each extracted feature with a predetermined threshold; and
removing from consideration false positive locations having an extracted feature which bears a predetermined relationship with respect to said predetermined threshold.

133. The storage medium of claim 132, wherein said extracting step comprises:
extracting at least one of contrast, standard deviation, and correlation between contrast and standard deviation at the locations of the candidate abnormalities in the subtraction image.

134. The storage medium of claim 133, wherein contrast and standard deviation are extracted.

135. The storage medium of claim 133, wherein contrast and correlation are extracted.

136. The storage medium of claim 133, wherein standard deviation and correlation are extracted.

137. The storage medium of claim 134, wherein correlation is extracted.

138. The storage medium of claim 137, comprising:
displaying at least one of said original, first, second and subtraction images with locations of candidate abnormalities under consideration identified in the displayed image.

139. The storage medium of claim 122, further comprising:
locating locations of candidate abnormalities in the subtraction image;
extracting at least one predetermined feature from each candidate abnormality;
comparing each extracted feature with a predetermined threshold; and
removing from consideration false positive locations having an extracted feature which bears a predetermined relationship with respect to said predetermined threshold.

140. The storage medium of claim 139, wherein said extracting step comprises:
extracting at least one of contrast, standard deviation, and correlation between contrast and standard deviation at the locations of the candidate abnormalities in the subtraction image.

141. The storage medium of claim 140, wherein contrast and standard deviation are extracted.

142. The storage medium of claim 140, wherein contrast and correlation are extracted.

143. The storage medium of claim 140, wherein standard deviation and correlation are extracted.

144. The storage medium of claim 141, wherein correlation is extracted.

145. The storage medium of claim 144, comprising:
displaying at least one of said original, first, second and subtraction images with locations of candidate abnormalities under consideration identified in the displayed image.

146. A storage medium storing a program for performing the steps of:
obtaining a digital first image of a chest of a subject;
detecting ribcage edges on both sides of the lungs in said first chest image;
determining average horizontal locations of the left and right ribcage edges at plural vertical locations;
fitting the determined average horizontal locations to a straight line to derive a midline; rotating the chest image so that the midline is vertical; and
shifting the rotated image to produce a lateral inclination corrected second image with the midline centered in said lateral inclination corrected image.

147. The storage medium of claim 146, further comprising:
obtaining a temporally separated digital third image of the chest of the same subject; detecting ribcage edges on both sides of the lungs in said third image;
determining average horizontal locations of the left and right ribcage edges at plural vertical locations in said third image;
fitting the determined average horizontal locations to a straight line to derive a midline in said third image;
rotating the third image so that the mid line detected in said third image is vertical;
shifting the rotated image to produce a lateral inclination corrected fourth image with the midline centered in said fourth image; and
performing image warping on one of the second and fourth images to produce a warped image which is registered to the other of said second and fourth images; and
subtracting the warped image from the other image to generate a subtraction image.

148. The storage medium of claim 147, comprising:
displaying at least one of the first through fourth and subtraction images.

149. The storage medium of claim 146, wherein said step of performing image warping comprises:
performing global matching to align the lung areas of the one image to the other image;
performing local matching of selected regions of interest in the right and left lungs of said one image to the right and left lungs of the other image to generate shift values for pixels of said one image;
performing surface fitting on the shift values of the right lung of the one image and independently performing surface fitting of shift values of the left lung of the one image to smooth the shift values and generate fitted shift values for the left and right lungs of the one image;
shifting pixels of the one image using the fitted shift values.

150. The storage medium of claim 147, further comprising:
producing an enhanced subtraction image, including:
enhancing contrast of the lung regions of the subtraction image;
adding a predetermined pixel value to the pixel values of the lung regions of the subtraction image;
maintaining pixels of regions other than the lung regions of the subtraction image at one of,
(1) a constant pixel value to generate a uniform background, and
(2) at the values of corresponding pixels in one of the first, second, third and fourth images; and
displaying the enhanced subtraction image.

151. The storage medium of claim 149, further comprising:
producing an enhanced subtraction image, including:
enhancing contrast of the lung regions of the subtraction image;
adding a predetermined pixel value to the pixel values of the lung regions of the subtraction image;
maintaining pixels of regions other than the lung regions of the subtraction image at one of,
(1) a constant pixel value to generate a uniform background, and
(2) at the values of corresponding pixels in one of the first, second, third and fourth images; and
displaying the enhanced subtraction image.

152. The storage medium of claim 149, wherein the step of performing image warping comprises:
- reducing by a predetermined factor the matrix size of the first and second images prior to performing global matching;
- scaling fitted shift values by the predetermined factor for application of the scaled fitted shift values to pixels of said one image;
- shifting pixels of said one image using the scaled fitted shift values;
- displaying the subtraction image.

153. The storage medium of claim 151, wherein the step of performing image warping comprises:
- reducing by a predetermined factor the matrix size of the first and second images prior to performing global matching;
- scaling fitted shift values by the predetermined factor for application of the scaled fitted shift values to pixels of said one image;
- shifting pixels of said one image using the scaled fitted shift values; displaying the subtraction image.

154. The storage medium of claim 147, further comprising:
- locating locations of candidate abnormalities in the subtraction image;
- extracting at least one predetermined feature from each candidate abnormality;
- comparing each extracted feature with a predetermined threshold; and
- removing from consideration false positive locations having an extracted feature which bears a predetermined relationship with respect to said predetermined threshold.

155. The storage medium of claim 154, wherein said extracting step comprises:
- extracting at least one of contrast, standard deviation, and correlation between contrast and standard deviation at the locations of the candidate abnormalities in the subtraction image.

156. The storage medium of claim 155, wherein contrast and standard deviation are extracted.

157. The storage medium of claim 155, wherein contrast and correlation are extracted.

158. The storage medium of claim 155, wherein standard deviation and correlation are extracted.

159. The storage medium of claim 156, wherein correlation is extracted.

160. The storage medium of claim 159, comprising:
- displaying at least one of said first, second, third, fourth and subtraction images with locations of candidate abnormalities under consideration identified in the displayed image.

161. The storage medium of claim 149, further comprising:
- locating locations of candidate abnormalities in the subtraction image;
- extracting at least one predetermined feature from each candidate abnormality;
- comparing each extracted feature with a predetermined threshold; and
- removing from consideration false positive locations having an extracted feature which bears a predetermined relationship with respect to said predetermined threshold.

162. The storage medium of claim 161, wherein said extracting step comprises:
- extracting at least one of contrast, standard deviation, and correlation between contrast and standard deviation at the locations of the candidate abnormalities in the subtraction image.

163. The storage medium of claim 162, wherein contrast and standard deviation are extracted.

164. The storage medium of claim 162, wherein contrast and correlation are extracted.

165. The storage medium of claim 162, wherein standard deviation and correlation are extracted.

166. The storage medium of claim 163, wherein correlation is extracted.

167. The storage medium of claim 166, comprising:
- displaying at least one of said first, second and subtraction images with locations of candidate abnormalities under consideration identified in the displayed image.

168. The storage medium of claim 154, further comprising:
- locating locations of candidate abnormalities in the subtraction image;
- extracting at least one predetermined feature from each candidate abnormality;
- comparing each extracted feature with a predetermined threshold; and
- removing from consideration false positive locations having an extracted feature which bears a predetermined relationship with respect to said predetermined threshold.

169. The storage medium of claim 168, wherein said extracting step comprises:
- extracting at least one of contrast, standard deviation, and correlation between contrast and standard deviation at the locations of the candidate abnormalities in the subtraction image.

170. The storage medium of claim 169, wherein contrast and standard deviation are extracted.

171. The storage medium of claim 169, wherein contrast and correlation are extracted.

172. The storage medium of claim 169, wherein standard deviation and correlation are extracted.

173. The storage medium of claim 170, wherein correlation is extracted.

174. The storage medium of claim 173, comprising:
- displaying at least one of said first, second, third, fourth and subtraction images with locations of candidate abnormalities under consideration identified in the displayed image.

* * * * *

UNITED STATES PATENT AND TRADEMARK OFFICE
CERTIFICATE OF CORRECTION

| | | |
|---|---|---|
| PATENT NO. | : 7,043,066 B1 | Page 1 of 1 |
| APPLICATION NO. | : 09/830502 | |
| DATED | : May 9, 2006 | |
| INVENTOR(S) | : Doi et al. | |

It is certified that error appears in the above-identified patent and that said Letters Patent is hereby corrected as shown below:

On the title page, Item (60), the Related U.S. Application Data information had been omitted. Item (60) should read:

On the Title Page insert:
-- (60)      Related U.S. Application Data

Provisional application No. 60/107,095, Nov. 5, 1998. --

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO.         : 7,043,066 B1                                                           Page 1 of 1
APPLICATION NO.    : 09/830562
DATED              : May 9, 2006
INVENTOR(S)        : Doi et al.

It is certified that error appears in the above-identified patent and that said Letters Patent is hereby corrected as shown below:

On the title page, Item (60), the Related U.S. Application Data information had been omitted. Item (60) should read:

On the Title Page insert:
-- (60)           RELATED U.S. APPLICATION DATA

Provisional application No. 60/107,095, Nov. 5, 1998. --

This certificate supersedes Certificate of Correction issued August 15, 2006.

Signed and Sealed this

Nineteenth Day of September, 2006

JON W. DUDAS
*Director of the United States Patent and Trademark Office*